United States Patent
Akiyama

(10) Patent No.: US 8,832,680 B2
(45) Date of Patent: Sep. 9, 2014

(54) INSTALLATION EVENT COUNTING APPARATUS AND PACKAGE CREATION METHOD

(75) Inventor: Toshio Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 13/530,869

(22) Filed: Jun. 22, 2012

(65) Prior Publication Data

US 2013/0014100 A1 Jan. 10, 2013

(30) Foreign Application Priority Data

Jul. 8, 2011 (JP) ................................. 2011-151903

(51) Int. Cl.
G07B 17/00 (2006.01)
G07F 19/00 (2006.01)
G06F 9/44 (2006.01)
G06F 9/445 (2006.01)

(52) U.S. Cl.
USPC ............. 717/176; 705/30; 717/133; 717/168; 717/170; 717/174; 717/175; 717/177; 717/178

(58) Field of Classification Search
None
See application file for complete search history.

(56) References Cited

U.S. PATENT DOCUMENTS

| | | | | |
|---|---|---|---|---|
| 6,073,214 A * | 6/2000 | Fawcett | ........................ | 711/133 |
| 6,363,499 B1 * | 3/2002 | Delo et al. | ........................ | 714/15 |
| 6,438,749 B1 * | 8/2002 | Chamberlain | ................ | 717/174 |
| 6,604,238 B1 * | 8/2003 | Lim et al. | ........................ | 717/177 |
| 7,185,334 B2 * | 2/2007 | Bourke-Dunphy et al. | .. | 717/174 |
| 7,448,033 B1 * | 11/2008 | Kruger et al. | .................. | 717/175 |
| 7,624,394 B1 * | 11/2009 | Christopher, Jr. | .............. | 717/177 |
| 2002/0019977 A1 * | 2/2002 | Matsuzuki | ..................... | 717/170 |
| 2003/0051235 A1 * | 3/2003 | Simpson | ........................ | 717/174 |
| 2005/0010812 A1 * | 1/2005 | Terrell et al. | ................... | 713/201 |
| 2005/0066324 A1 * | 3/2005 | Delgado et al. | ............... | 717/170 |
| 2005/0102667 A1 * | 5/2005 | Barta et al. | ..................... | 717/174 |
| 2006/0265707 A1 * | 11/2006 | Hayes et al. | ................... | 717/174 |
| 2007/0061803 A1 * | 3/2007 | Barrett | .......................... | 717/178 |
| 2007/0261047 A1 * | 11/2007 | Sah et al. | ....................... | 717/168 |
| 2007/0288916 A1 * | 12/2007 | Harada | .......................... | 717/174 |
| 2008/0005281 A1 * | 1/2008 | Hsueh et al. | ................... | 709/219 |
| 2008/0177711 A1 * | 7/2008 | Blake et al. | .................... | 717/174 |
| 2009/0158272 A1 * | 6/2009 | El-Assir et al. | ............... | 717/177 |
| 2010/0192147 A1 * | 7/2010 | Kadota | .......................... | 717/178 |

(Continued)

FOREIGN PATENT DOCUMENTS

| | | |
|---|---|---|
| JP | 2004-185084 | 7/2004 |
| JP | 2006-350896 | 12/2006 |
| JP | 4375778 | 9/2009 |

(Continued)

*Primary Examiner* — Don Wong
*Assistant Examiner* — Anibal Rivera
(74) *Attorney, Agent, or Firm* — Oblon, Spivak, McClelland, Maier & Neustadt, L.L.P.

(57) ABSTRACT

A log counting program causes a computer to function as a log counting apparatus, and function as a log collection part collecting log information from a client apparatus in which an installer package operates; and a log counting part carrying out counting concerning the collected log information. The installer package causes the client apparatus to function as one or more installers for installing software; a log obtaining part obtaining logs that are output by the one or more installers and system information of the client apparatus; and a log transmission part transmitting log information including the logs and the system information to the log counting apparatus according to a setting in the installer package. The log counting part uses the system information and counts events concerning the installation while distinguishing an execution environment of the client apparatus.

9 Claims, 20 Drawing Sheets

(56) References Cited

U.S. PATENT DOCUMENTS

| | | | |
|---|---|---|---|
| 2011/0023126 A1* | 1/2011 | Hayami | 726/26 |
| 2011/0202912 A1* | 8/2011 | Itoh | 717/177 |
| 2012/0030072 A1* | 2/2012 | Boudreau et al. | 705/30 |
| 2012/0151469 A1* | 6/2012 | Wookey | 717/175 |
| 2013/0124867 A1* | 5/2013 | Clayton et al. | 713/171 |

FOREIGN PATENT DOCUMENTS

| | | |
|---|---|---|
| JP | 2010-49363 | 3/2010 |
| JP | 4537670 | 6/2010 |

\* cited by examiner

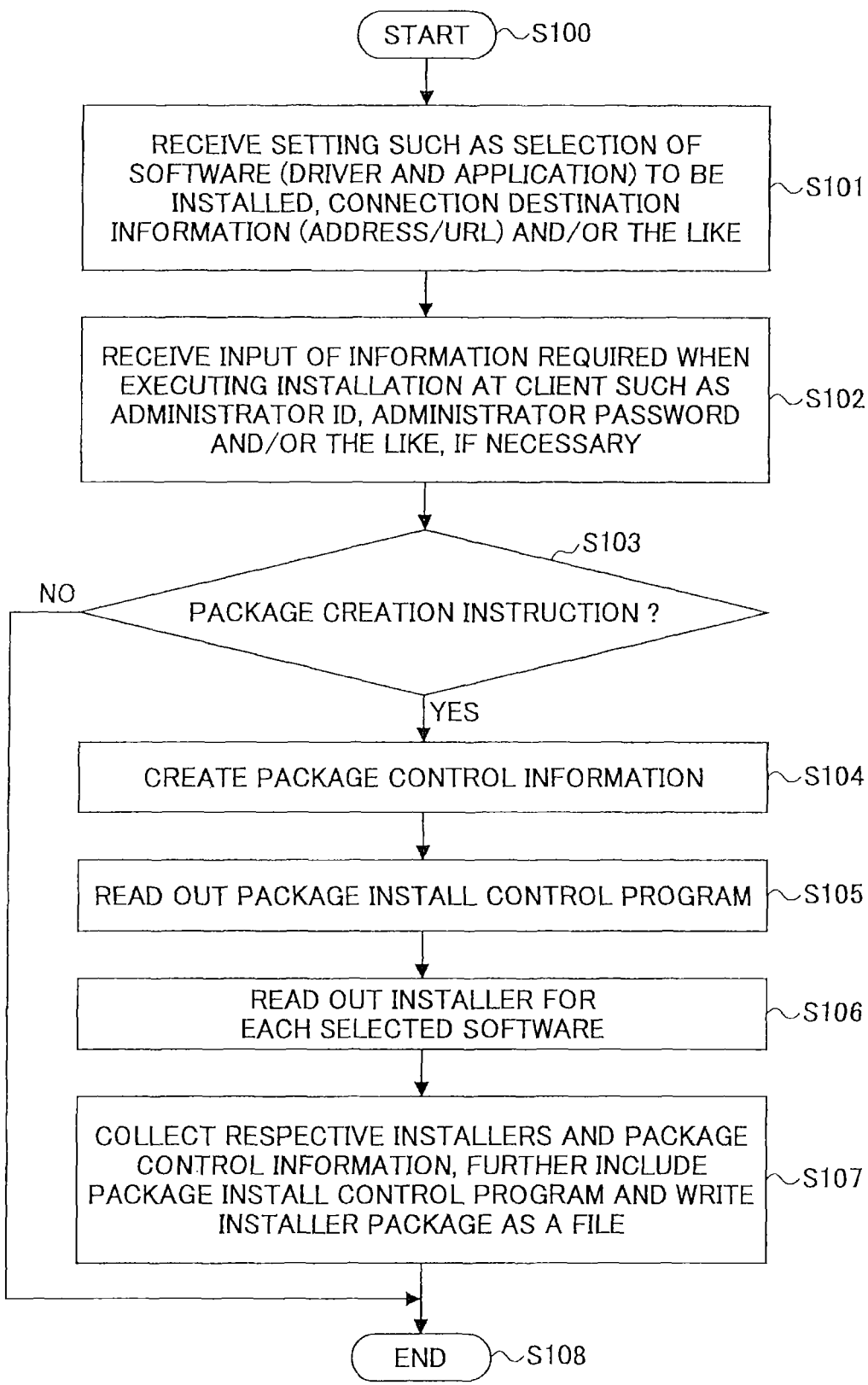

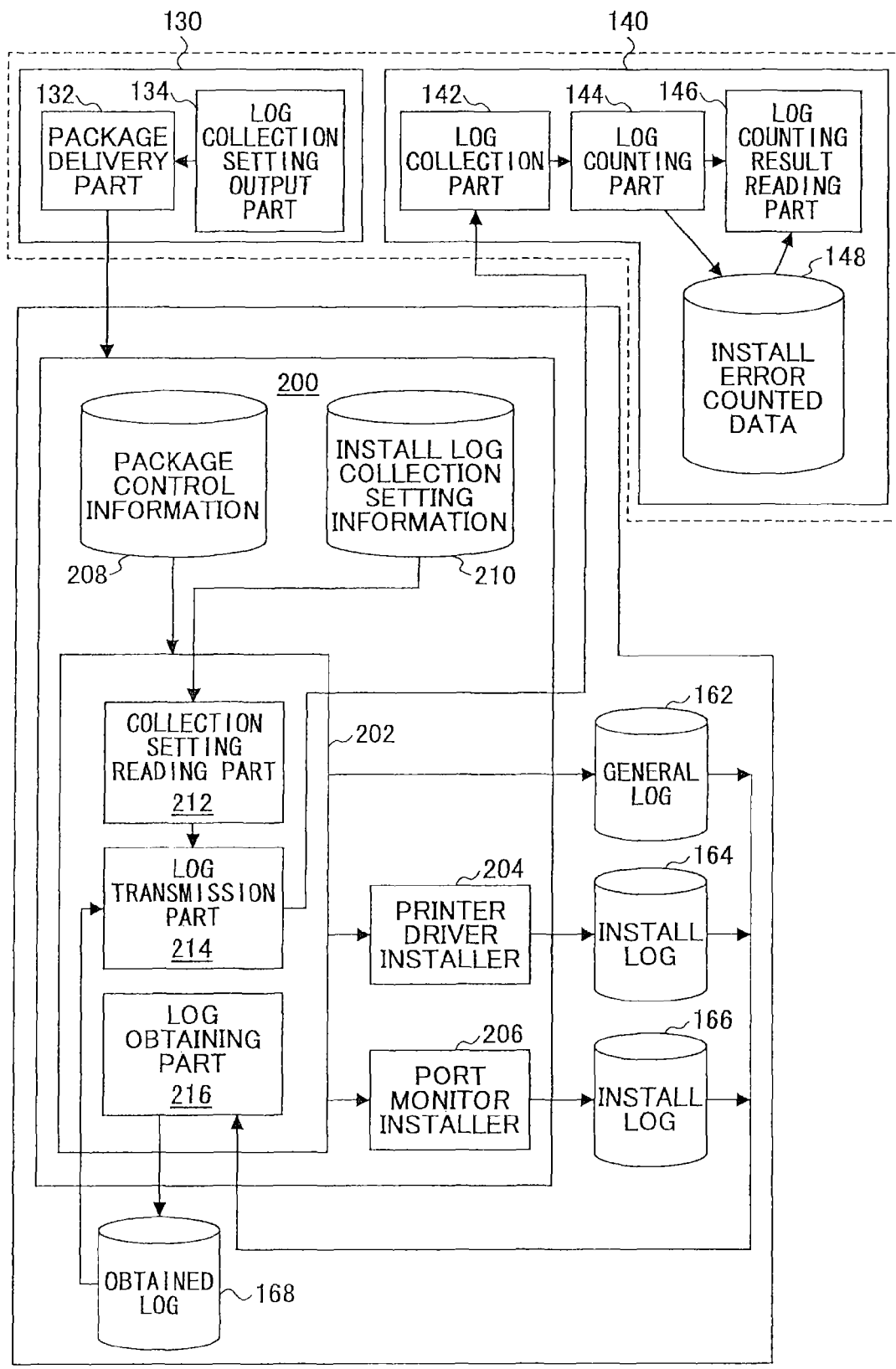

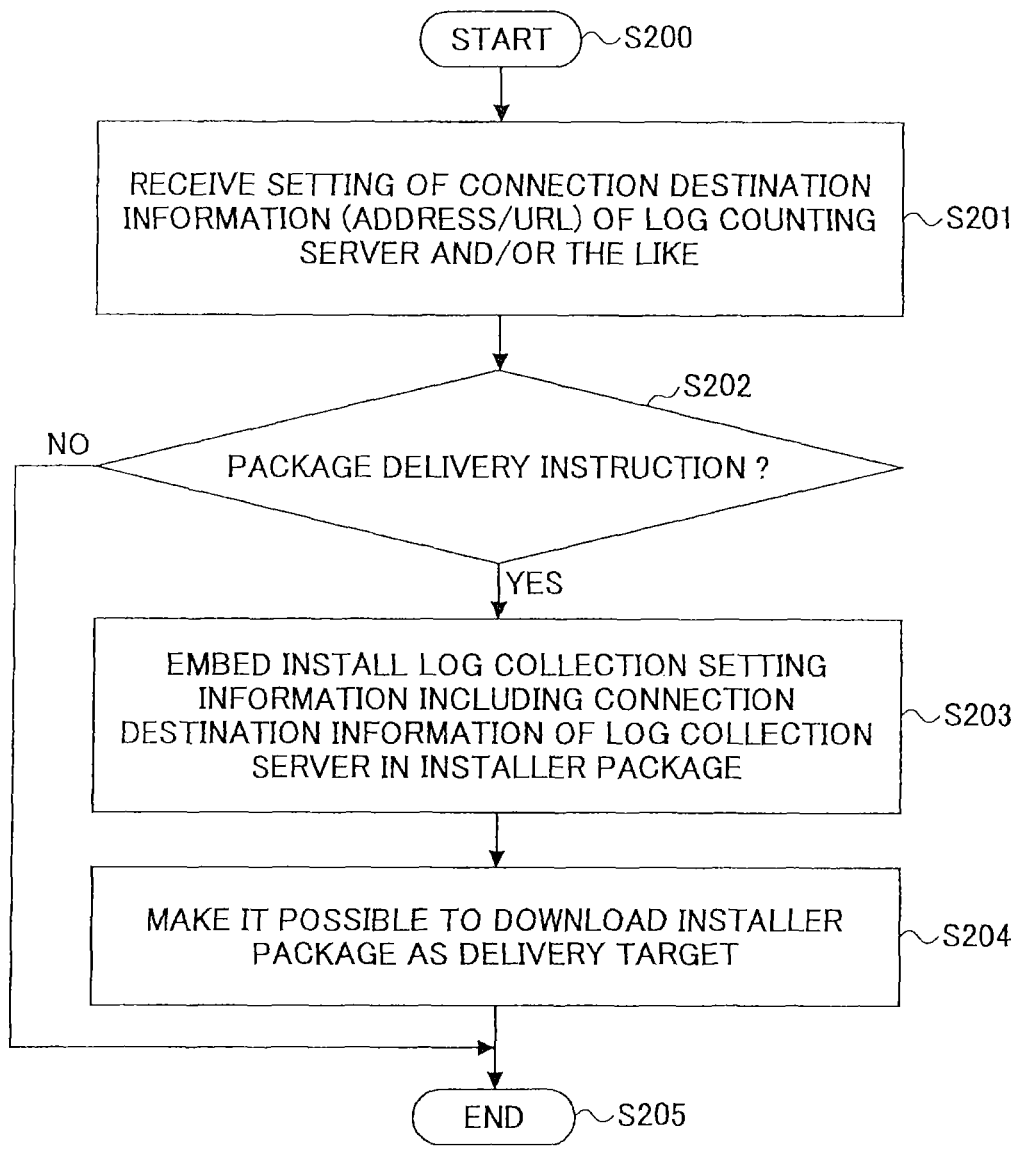

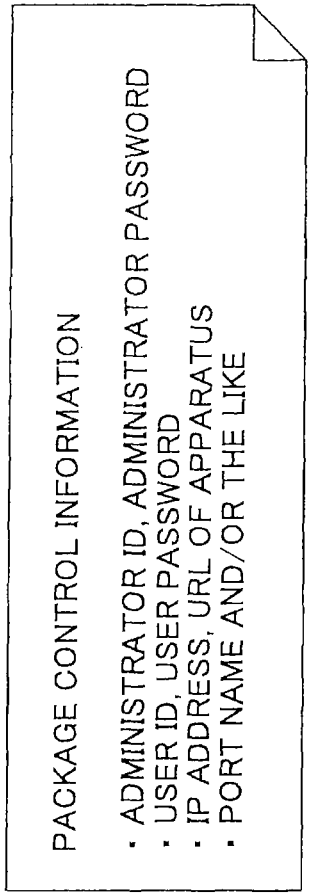

FIG.6A

PACKAGE CONTROL INFORMATION

· ADMINISTRATOR ID, ADMINISTRATOR PASSWORD
· USER ID, USER PASSWORD
· IP ADDRESS, URL OF APPARATUS
· PORT NAME AND/OR THE LIKE

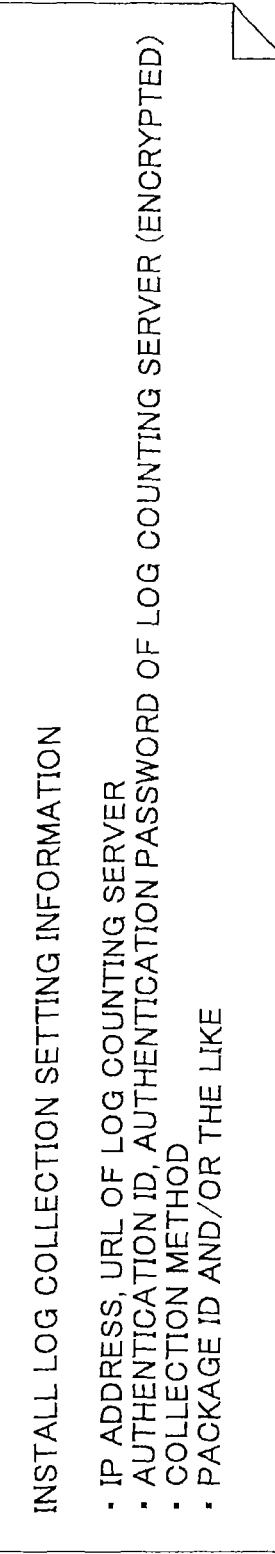

FIG.6B

INSTALL LOG COLLECTION SETTING INFORMATION

· IP ADDRESS, URL OF LOG COUNTING SERVER
· AUTHENTICATION ID, AUTHENTICATION PASSWORD OF LOG COUNTING SERVER (ENCRYPTED)
· COLLECTION METHOD
· PACKAGE ID AND/OR THE LIKE

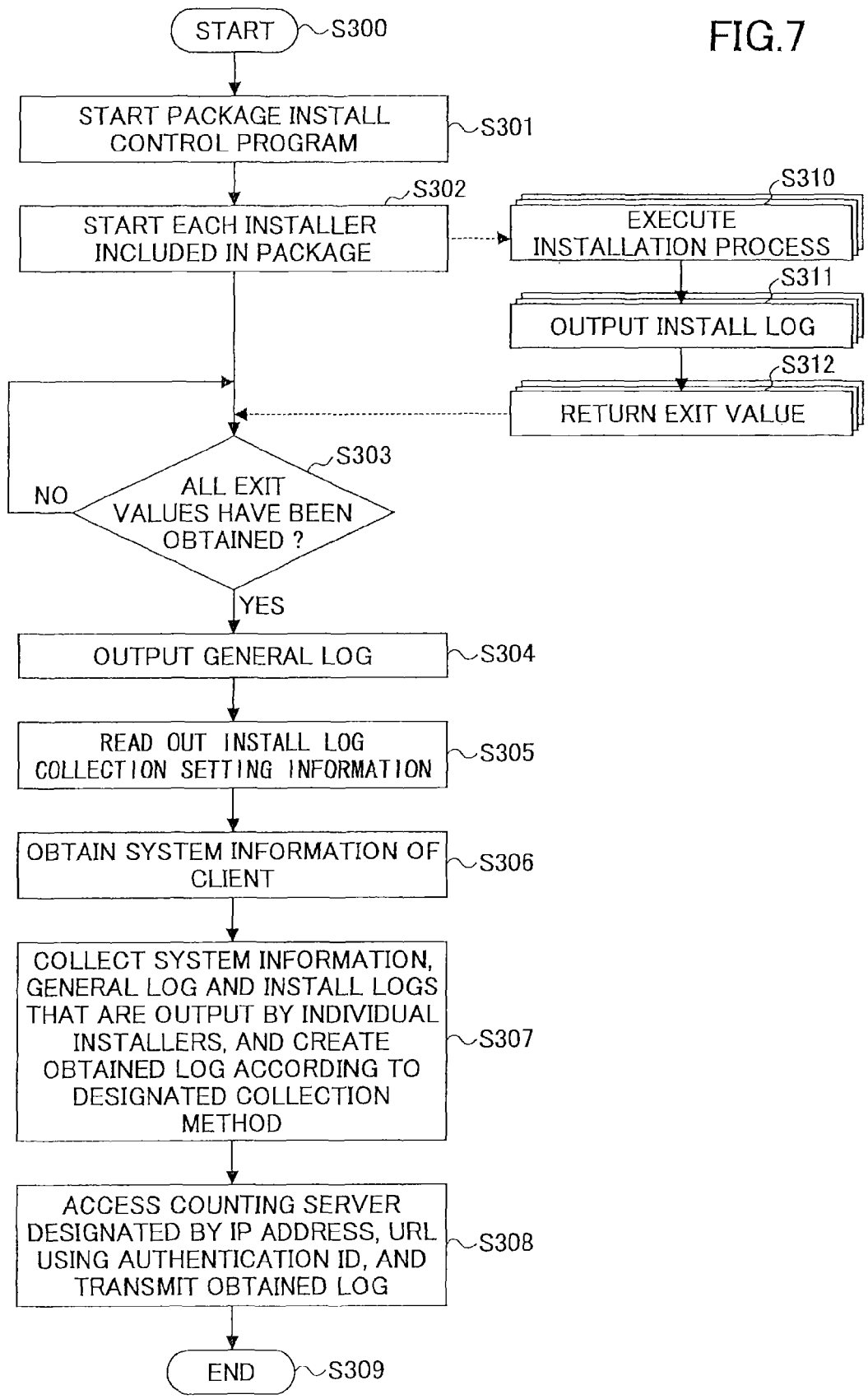

FIG.8

| GENERAL LOG ||
|---|---|
| NUMBER OF INSTALLERS | 2 |
| NUMBER OF SUCCESSES | 1 |
| NUMBER OF FAILURES | 1 |
| PACKAGE ID | xxxxxxxxxxxxxx |
| SYSTEM INFORMATION ||
| HOST NAME | HOST_A |
| UUID | xxxxxxxx-xxxx-xxxx-xxxx-xxxxxxxxxxxx |
| IPv4 ADDRESS | xxx.xxx.xxx.xxx |
| IPv6 ADDRESS | xxxx:xxxx:xxxx:xxxx:xxxx:xxxx:xxxx:xxxx |
| MAC ADDRESS | xx:xx:xx:xx:xx:xx |
| OS NAME | xxxxxxx |
| VERSION NAME | x.1 |
| INSTALLATION DESTINATION | c¥system |
| USER NAME | USER_A |
| PRINTER LOG ||
| SOFTWARE | PRINTER DRIVER |
| VERSION | 2.0 |
| RESULT | OK |
| ERROR CODE | - |
| PORT MONITOR LOG ||
| SOFTWARE | PORT MONITOR APPLICATION |
| VERSION | 1.1 |
| RESULT | NG |
| ERROR CODE | xxxxxxx |

FIG.11

| USER NAME | DOWNLOAD COUNTER | INSTALL COUNTER | | | ENVIRONMENT COUNTER | | |
|---|---|---|---|---|---|---|---|
| | NUMBER OF TIMES DOWNLOADED | NUMBER OF TIMES INSTALLED | NUMBER OF TIMES OF ERRORS | NUMBER OF TIMES OF SUCCESSES | NUMBER OF TIMES INSTALLED | NUMBER OF TIMES OF ERRORS | NUMBER OF TIMES OF SUCCESSES |
| USER A | 1 | 5 | 3 | 2 | 1 | 1 | 1 |
| USER B | 3 | 1 | 0 | 1 | 1 | 0 | 1 |
| USER C | 1 | 5 | 5 | 0 | 5 | 5 | 0 |

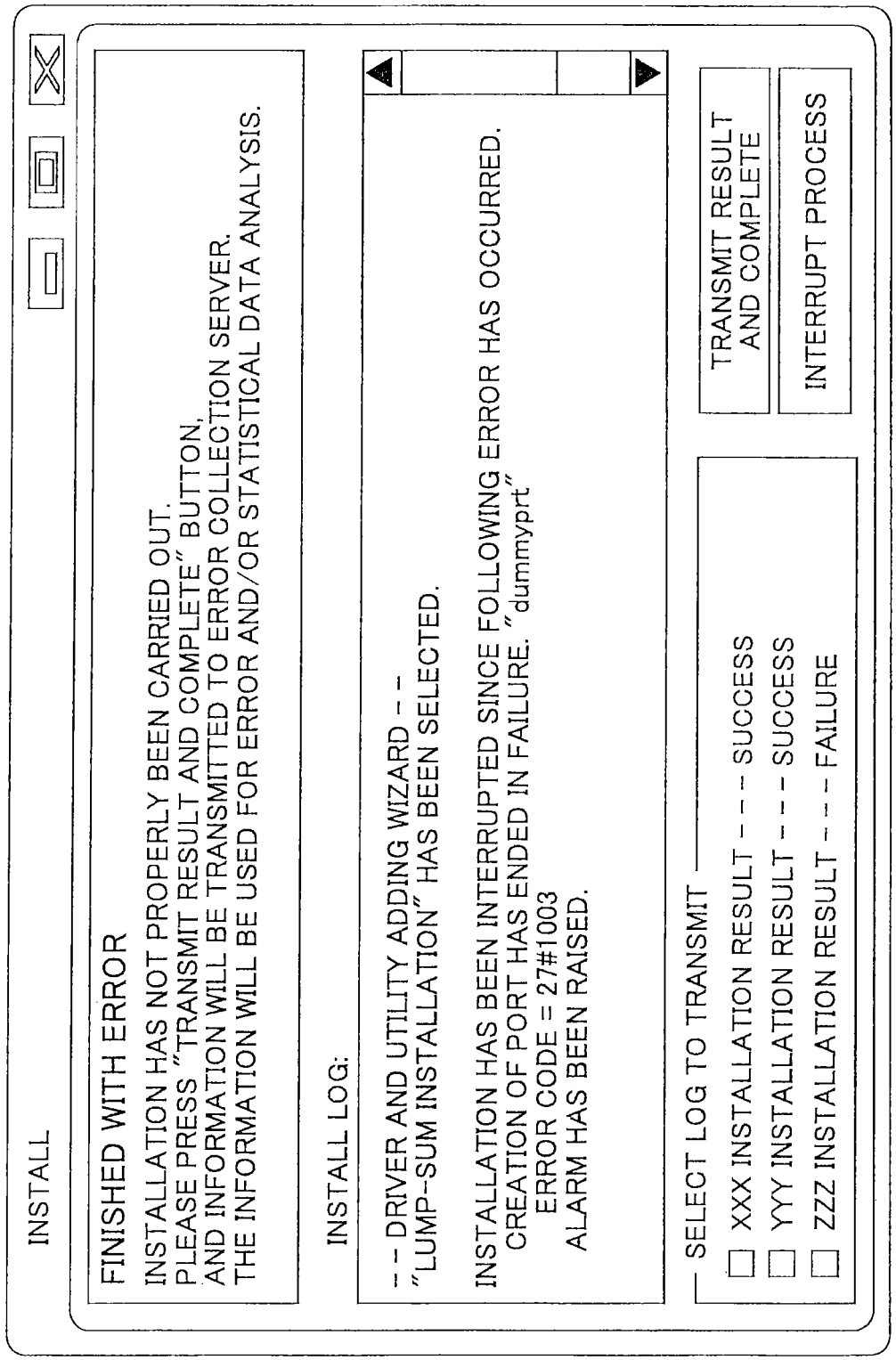

FIG.17A

[XXX_Install_LOG]
    LOG_TYPE = FOLDER
    LOG_PATH=c:¥xxx¥log¥

FIG.17B

[YYY_Install_LOG]
    LOG_TYPE = SINGLE_FILE
    LOG_PATH=c:¥xxx¥log¥
    FILE_NAME= ABC*.log

FIG.17C

[ZZZ_Install_LOG]
    LOG_TYPE = MULTIPLE_FILE
    LOG_PATH=c:¥xxx¥log¥
    FILE_NAME= ABC*.*

INSTALLATION EVENT COUNTING APPARATUS AND PACKAGE CREATION METHOD

BACKGROUND OF THE INVENTION

1. Field of the Invention

The embodiments discussed herein relate to log collection in an installation process. In more detail, the embodiments relate to a non-transitory computer readable information recording medium storing therein a log counting program for realizing by a computer a log counting apparatus that collects logs from a client apparatus in which an installer package operates, the log counting apparatus and a package creation method.

2. Description of the Related Art

For an information system administrator of an organization such as a public office, a company, a university or the like, the work of installing applications and drivers in respective personal computers that the information system administrator manages may be troublesome. Recently, in order to reduce such a load of an information system administrator, a tool has been provided for assisting an information system administrator in creating an installer package that is used to install necessary applications, drivers, dedicated utilities and settings in a computer in a lump-sum manner.

By using such an assisting tool, it is possible to provide an installer package by which it is possible to carry out installation in a computer by simple operations even by an end user who does not have sufficient knowledge concerning information processing technology. For example, as a result of an administrator previously embedding IP addresses and/or URLs of apparatuses such as printers in an installer package, an end user can complete installation and various settings of drivers of the apparatuses even without having such kind of information. Further, since it is not necessary to operate plural installers for respective applications and/or drivers by an end user himself or herself, the work load of the end user is light, and difficulty in the operation is low. Further, a technique is known by which even when administrative rights are needed for installation, a user who does not have administrative rights can carry out the installation (see Patent references Nos. 1 and 2, mentioned later).

As a technique for assisting an installation process, a precondition investigating information collection assisting system is known to determine whether a computer satisfies preconditions of software to be installed, as discussed in Patent reference No. 3 (mentioned later). As a technology concerning errors occurring at a time of the installation process, a configuration discussed in Patent reference No. 4 (mentioned later) is known. According to Patent reference No. 4, when an installation error occurs during the installation process, a user's computer indicates an error code, collects system information of the computer and transmits them to a support server together with the error code. Then, the user's computer receives "support information for avoiding errors" that has been generated by the support server and obtained from the error code and system information, and displays the information on screen.

However, in a large-scale organization, there may be many cases to install packages in hundreds of computers, and errors may occur with a large probability during the processes of installing software included in the packages. Also, there may be cases where errors occur in some small number of computers even in the same environment. In such a situation, it may be difficult to reproduce the specific error in another computer, it may be difficult to determine the causes thereof, and it may be difficult to analyze the causes even by the development agency.

Accordingly, for a system administrator who creates and delivers installer packages, it may be highly required to understand how much the delivered packages have caused problems and under which environments and/or conditions the problems have occurred, if any. Such kind of information is also useful for solving the problems, and also, may be used to understand a degree to which the business has been affected thereby.

The technique of the above-mentioned Patent reference No. 4 is also known as the above-mentioned technique concerning errors occurring during an installation process. According to the technique, information is sent to a support center concerning the specific software. Thus, according to the technique of Patent reference No. 4, it is possible to reduce a user's work of actually contacting the support center, explaining the system information and/or the operation conditions of the user's computer to the operator and then waiting for the operator's answer. However, the above-mentioned problems on the side of the system administrator concerning the installer packages may be left unsolved.

SUMMARY OF THE INVENTION

According to the embodiments, a computer readable information recording medium that stores a log counting program that causes a computer to function as a log counting apparatus that is capable of communicating with a client apparatus via a communication network, and the log counting apparatus are provided. The log counting apparatus includes a log collection part that collects log information from the client apparatus in which an installer package operates; and a log counting part that carries out counting concerning the collected log information. The installer package is a computer executable program for causing the client apparatus to function as one or more installers for installing software; a log obtaining part that obtains logs that are output by the one or more installers and system information of the client apparatus; and a log transmission part that transmits log information that includes the logs and the system information to the log counting apparatus according to a setting in the installer package. The log counting part of the log counting apparatus uses the system information included in the log information, and counts events concerning the installation process while distinguishing the execution environment of the client apparatus.

Further, according to the embodiments, a package creation method executed by a computer may be provided for creating an installer package executable by a client apparatus. The package creation method includes the steps of receiving a setting that includes selection of one or more sets of software to be installed, carried out by a computer; and reading out a package installer control program and installers corresponding to the one or more sets of software, including them and creating the installer package, carried out by a computer.

Other objects, features and advantages of the present invention will become more apparent from the following detailed description when read in conjunction with the accompanying drawings.

BRIEF DESCRIPTION OF THE DRAWINGS

FIG. 3 is a flowchart showing a package creation process using the packager program that the administrator terminal according to the first embodiment executes;

FIG. 4 shows functional blocks realized in a package delivery server, a log counting server and a client according to the first embodiment;

FIG. 5 is a flowchart showing a package delivery process carried out by the package delivery server according to the first embodiment;

FIG. 6A illustrates a data structure of a package control information created by a packager; and FIG. 6B illustrates a data structure of a log collection setting information created by a log collection setting output part;

FIG. 7 is a flowchart of an installation process and a log transmission process subsequent thereto, carried out by the client that operates the installer package according to the first embodiment;

FIG. 8 illustrates a data structure of an obtained log generated by a log obtaining part according to the first embodiment;

FIG. 11 illustrates an event counting result created by an event counting process according to the first embodiment;

FIGS. 16A and 16B illustrate other examples of log transmission screen pages according to the second embodiment;

FIGS. 17A, 17B and 17C illustrate data structures of output log setting information according to the second embodiment.

DETAILED DESCRIPTION OF THE EMBODIMENTS

Although the embodiments will be described, the present invention is not limited to the embodiments. It is noted that for the embodiments, a network environment will be described as one example in which a log counting server as a log counting apparatus that executes a log counting program is included, and also, an administrator terminal as a package creation apparatus is included.

Figure 1:
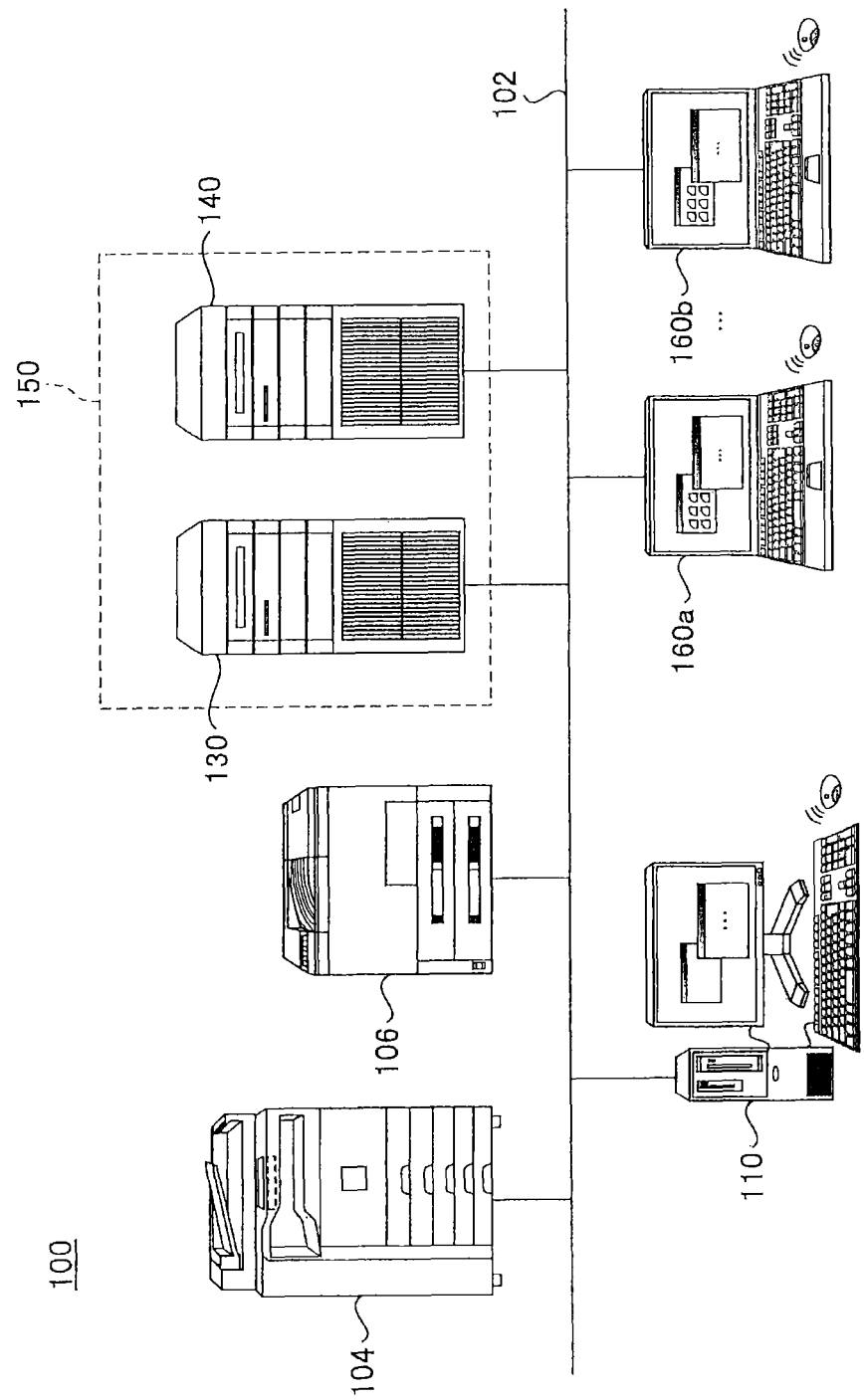
FIG. 1 shows a network environment in which a log counting server and an administrator terminal according to a first embodiment operate.

FIG. 1 shows a network environment in which a log counting server and an administrator terminal according to a first embodiment operate. The network environment 100 shown in FIG. 1 includes peripherals such as a multifunction peripheral 104 and a laser printer 106, the administrator terminal (packager) 110, a package delivery server 130, the log counting server 140 and clients 160 (160a, 160b, . . . ).

The administrator terminal 110 is a computer in which an installer packager program (hereinafter, simply referred to as a "packager program") for creating installer packages to be delivered to the clients 160 operates. The administrator terminal 110 obtains installers for designated one or more sets of software, embeds settings therefor, as the need arises, and creates an installer package for carrying out a process of installing the software in a lump-sum manner. The installer package will be described later in detail, and may include one or more software modules (including drivers for apparatuses, applications and/or the like), and settings for when the one or more software modules are installed. A system administrator uses the administrator terminal 110, and can create the desired installer package to be delivered to an end user(s).

The multifunction peripheral 104 and the laser printer 106 are apparatuses to which drivers will be installed using the installer package according to the first embodiment. However, apparatuses to which installation will be carried out are not limited to those shown in FIG. 1 as examples, and may be various peripherals to be used by the plural clients 160 via the network such as a facsimile machine, a scanner and/or the like.

The package delivery server 130 is a computer, and stores the installer package thus created by the administrator terminal in a manner to allow the installer package to be downloaded therefrom. In response to a request(s) from the client(s) 160, the package delivery server 130 delivers the installer package thereto.

The clients 160 (160a, 160b, . . . ) are computers which download the installer packages, start up the same, and carry out the processes of installing the software in a lump-sum manner. When the installation has been finished, the clients 160a, 160b, . . . , and so forth obtain logs concerning the installation processes, and transmit the logs to the log counting server 140 that is previously set.

The log counting server 140 is a computer which collects log information that is transmitted by the installer packages when the installer packages have been executed in the respective clients 160, and carries out counting concerning the collected log information. According to the first embodiment, the package delivery server 130 and the log counting server 140 are separate servers, respectively. However, according to another embodiment, it is also possible that a package delivery and log counting server 150 is provided which has both functions of package delivery and log counting.

A network 102 of the above-mentioned network environment 100 may include a wired network such as Ethernet (registered trademark) of 1000Base-TX and/or a wireless network according to a standard such as IEEE802.11. The apparatuses 104, 106, the administrator terminal 110, the package delivery server 130, the log counting server 140 and the clients 160a, 160b mutually communicate using the network 102 through packet communication based on a TPC/IP protocol. The network 102 may include a wide area network built under a secure environment using Virtual Private Network (VPN) or the like, other than a Local Area Network (LAN).

Figure 2:
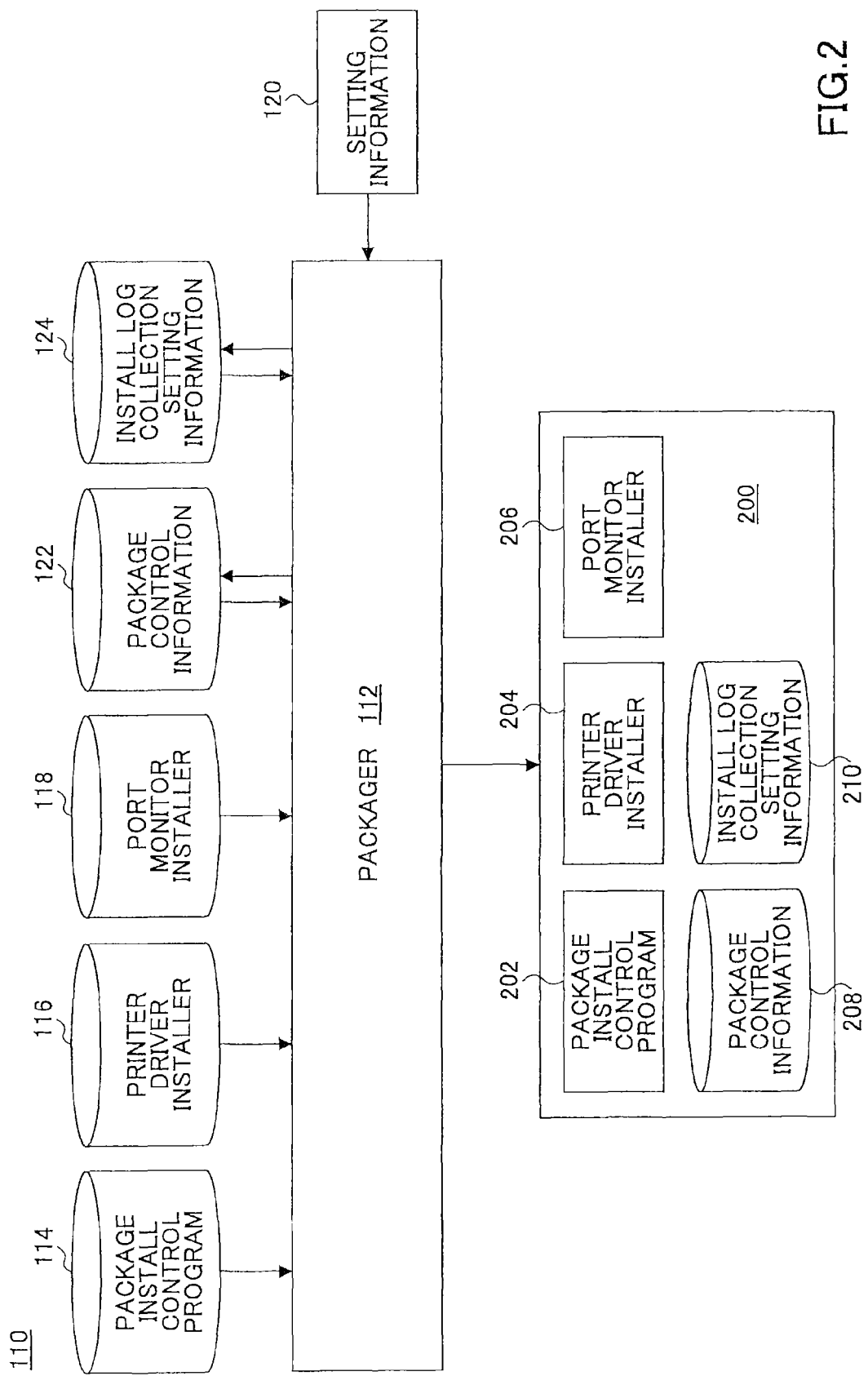
FIG. 2 shows functional blocks realized in the administrator terminal that executes a packager program according to the first embodiment.

Below, using FIGS. 2, 3 and 6A, details of the packager program according to the first embodiment will be described. FIG. 2 shows functional blocks realized in the administrator terminal 110 that executes the packager program according to the first embodiment. The administrator terminal shown in FIG. 2 includes a packager 112, a package install control program (hereinafter, simply referred to as an "install control program") 114, a printer driver installer 116 and a port monitor installer 118.

The install control program 114 will be included in an installer package 200 (as an install control program 202, described later) together with one or more installers, and is a module to carry out overall control of an installation process carried out by an apparatus (computer) to which the installer package 200 will be delivered. The install control program 114 is prepared to correspond to the type of the operating system (OS) included in the apparatus (computer) to which the installer package 200 will be delivered.

The printer driver installer 116 and the port monitor installer 118 are examples of the installers to be included in the installer package 200 (as those 204 and 206). The installers included in the installer package are prepared according to the selected software and to correspond to the type of the OS of the apparatus (computer) to which the installer package will be delivered. The port monitor installer 118 is an application to be included in the installer package, as the need arises, in a case where the printer driver installer 116 is included in the installer package. The port monitors are installed in the clients 160, and provide added functions of managing and monitoring printer ports and obtaining usage logs.

The packager 112 receives setting information 120 from the operator of the administrator terminal 110 via a user interface (UI) such as a graphical user interface, a command line interface or the like, and creates package control information 122.

FIG. 6A illustrates a data structure of the package control information 122 that the packager 112 according to the first embodiment creates. The package control information 122 includes various installation settings such as an Internet Protocol (IP) address or Universal Resource Locator (URL) of an apparatus corresponding to a driver installer included in the package, port names in a case of a printer driver, and/or the like. The package control information 122 may further include various sorts of information required for carrying out an installation process in each client 160 to which the package will be delivered, such as an administrator ID and an administrator password, a user ID and a user password, and/or the like.

Referring to FIG. 2 again, the packager 112 can receive the setting information 120 from the operator of the administrator terminal 110 via the UI, and create install log collection setting information (hereinafter, simply referred to as "log collection setting information") 124 to be embedded in the installer package. Details of the log collection setting information 124 will be described later, and the log collection setting information 124 may include various settings concerning an install log collection process (process of collecting install logs) such as the IP address or URL of the log counting server, a collection method and/or the like. The log collection setting information 124 may be embedded in the package when the package is created or may be embedded in the package when the package is delivered. According to the first embodiment described below, it is assumed that empty log collection setting information is written when the package is created, and actual log collection setting information is written when the package is delivered.

When having received a package creation instruction after receiving settings, the packager 112 reads out the install control program 114 and designates one or more sets of installers 116 and 118, and includes them in the package (as those 204 and 206. The packager 112 further reads out the package control information 122 (as the information 208) and, as the need arises, the log collection setting information 124 (as the information 210), and embeds them in the package. Thus, the packager 112 creates the installer package 200. Thus, the packager 112 carries out the steps of receiving the settings including selection of the one or more sets of software to be installed; and reading out the package installer control program and the installers corresponding to the one or more sets of software, including them and creating the installer package.

The created installer package 200 thus includes the install control program 202, the printer driver installer 204, the port monitor installer 206, the package control information 208 and, as the need arises, the log collection setting information 210. The installer package 200 is a type of file having a binary format operable by the clients 160 to which the installer package 200 will be delivered.

FIG. 3 is a flowchart showing a package creation process using the packager program executed by the administrator terminal 110 according to the first embodiment. When the packager program is started, the process shown in FIG. 3 is started from step S100. In step S101, the packager 112 receives, from the operator of the administrator terminal 110, operations to select software to be installed and to set connection destination information such as the IP address or URL of the connection destination apparatus, and writes them as the setting information 120. In step S102, the packager 112 further receives, as the need arises, from the operator of the administrator terminal 110, various information required for carrying out the installation processes in the clients to which the installer package will be delivered, such as the administrator ID and the administrator password, and/or the like, and writes them in the setting information 120.

In step S103, the packager 112 waits for an instruction from the operator, and when having received a package creation instruction (step S103 YES), the packager 112 proceeds to step S104. In step S104, the packager 112 reads the above-mentioned setting information 120, and creates the package control information 122 in a proper format. In step S105, the packager 112 reads out the install control program 114 corresponding to the OS of the delivery destination(s). In step S106, the packager 112 reads out the one or more installers 116 and 118 for installation of the software selected in step S101.

Step S107, the packager 112 writes the installer package 200 as a file executable by the clients 160, by collecting the one or more installers 116 and 118 and the package control information 122 and further including the install control program 114. In step S108, the packager 112 finishes the process of FIG. 3. On the other hand, when having received a cancellation instruction from the operator in step S103 (NO), the packager 112 proceeds to step S108 in a branching manner, and finishes the process of FIG. 3.

It is noted that according to the first embodiment, as described above, in response to settings and instructions given by the operator of the administrator terminal 110, the single installer package to be delivered to the plural clients 160 is created. However, in another embodiment, it is also possible to previously prepare data that describes setting contents for the respective clients, and create the installer packages for the respective clients. In this case, the packager 112 may read the previously prepared data, and create the installer packages while changing the settings of a printer name, a port name, a user code, and/or the like for the respective computers which are to execute the installer packages.

Below, using FIGS. 4, 5 and 6B, a package delivery process according to the first embodiment will be described. FIG. 4 shows functional blocks realized in the package delivery server 130, the log counting server 140 and the client 160 according to the first embodiment. The package delivery server 130 shown in FIG. 4 includes a package delivery part 132 and a log collection output part 134.

The log collection setting output part 134 outputs log collection setting information to the installer package 200 in a case where no log collection setting information has been written when the package has been created. The log collection setting output part 134 receives an input of setting information from the operator of the package delivery server 130, creates log collection setting information 210, and outputs it to a predetermined field included in the installer package 200.

The package delivery part 132 stores the installer package 200 (uploaded from the administrator terminal 110 as will be described later), to which the log collection setting information 210 has been written when the package has been created or the log collection setting information 210 has been written by the log collection setting output part 134 before the package is delivered as described above, in a storage unit in a manner to allow the installer package 200 to be downloaded therefrom. Then, the package delivery part 132 delivers the installer package 200 to the clients 160 in response to requests therefrom. The package delivery part 132 is configured as a web server, a file transfer server, or the like.

FIG. 6B illustrates a data structure of the log collection setting information 210 created by the log collection setting output part 134 according to the first embodiment. As shown in FIG. 6B, the log collection setting information 210 includes information for accessing the log counting server such as the IP address or URL of the log counting server 140, information indicating a log collection method, and a unique package ID for identifying the installer package. The log collection setting information 210 may further include an authentication ID and an authentication password in a case where an authentication process is required when accessing the log counting server 140. It is noted that authentication information such as an authentication ID and an authentication password may be preferably embedded in the installer package 200 after being encrypted.

The log collection method is setting information for designating a data form of logs and log items to collect. The data form may include, for example, a designation as to whether it is uncompressed or zip-compressed, a designation as to whether respective logs output from plural installers are collected and transmitted in an aggregated manner or are not collected and transmitted separately, or the like. As the log items to collect, designations of items to be collected to the log counting server 140 are included, such as whether the installation has succeeded or has ended in failure, an error code, if any, and system information such as the IP addresses, MAC addresses and/or the like of the clients 160.

FIG. 5 is a flowchart of the package delivery process carried out by the package delivery server 130. The process shown in FIG. 5 is started from step S200 in response to the installer package being uploaded from the administrator terminal 110 to the package delivery server 130, and a package delivery start instruction therefor from the operator of the package delivery server 130 being received. In step S201, the package delivery server 130 receives settings such as connection destination information for the log counting server 140 (IP address or URL), the data form, and/or the like, from the operator of the package delivery server 130 via a UI.

In step S202, the package delivery server 130 waits for an instruction from the operator, and, when having received a package delivery instruction (step S202 YES), the package delivery server 130 proceeds to step S203. In step S203, the log collection setting output part 134 of the package delivery server 130 creates the log collection setting information 210 according to the settings received in step S201, and embeds it in the installer package 200.

In step S204, the package delivery part 132 of the package delivery server 130 stores the completed installer package 200 in the storage unit as a target to deliver in a manner to allow the installer package 200 to be downloaded therefrom. In step S205, the package delivery server 130 finishes the process of FIG. 5. On the other hand, in a case of having received a cancellation instruction from the operator (step S202 NO), the package delivery server 130 proceeds to step S205 in a branching manner, and finishes the process of FIG. 5. When the installer package 200 has been thus stored in a manner to allow the installer package 200 to be downloaded therefrom, the installer package 200 is delivered to the respective clients 160 in response to requests therefrom.

Below, using FIGS. 4, 7 and 8, an installation process by the installer package according to the first embodiment and a log transmission process subsequent thereto will be described. Again referring to FIG. 4, the delivered installer package 200 includes the install control program 202. The install control program 202 in each client 160 reads out information from the package control information 208, starts up the one or more installers 204 and 206 also included in the installer package 200, proceeds with installation processes and carries out control to obtain install logs and transmit them to the log counting server 140.

The installers 204 and 206 thus started up carry out the installation processes, respectively, and output install logs 164 and 166, respectively. When all processes of all the installers 204 and 206 have been finished or interrupted, the install control program 202 outputs a package general log 162 without regard to whether all of the installation processes have been ended successfully.

In more detail, as shown in FIG. 4, the install control program 202 includes a collection setting reading part 212, a log transmission part 214 and a log obtaining part 216. The collection setting reading part 212 reads out the log collection setting information 210 embedded in the installer package 200, and obtains information required for collecting logs such as the connection destination information for the log counting server 140, the log collection method and/or the like. The log obtaining part 216 obtains, according to the log collection method, the general log 162, the install log 164 of the printer driver installer 204, and the install log 166 of the port monitor installer 206, collects them and creates an obtained log 168. The obtained log 168 is created according to the log collection method, is uncompressed or zip-compressed, and the respective logs 162, 164 and 166 are collected into a single file or are plural respective separate files, according to the designations included in the log collection method.

FIG. 8 illustrates a data structure of the obtained log 168 generated by the log obtaining part 216 according to the first embodiment. As shown in FIG. 8, the obtained log 168 includes the general log in which records of the entirety of the installation processes carried out by the installer package are summarized, the system information, and logs that are records of the respective installation processes output by the respective installers. As the logs of the respective installers, FIG. 8 illustrates a log of the printer driver installer 204 (printer log) and a log of the port monitor installer 206 (port monitor log).

The general log 162 is not particularly limited, and may include the number of installers included in the package; the number of those thereof for which installation has succeeded; the number of those thereof for which installation has ended in failure; and a package ID that identifies the package. As the system information, the host name, Universal Unique IDentifier (UUID), IPv4 address, IPv6 address, MAC address, name of OS, version of OS and installed path ("installation destination") of OS of the delivery destination client, and the username of a user who has carried out the installation processes may be cited.

It is noted that, details will be described later, and the system information may preferably include information for distinguishing a client execution environment that is specified by the computer, the environment and, as the need arises, the user. Further, as the system information, it is also possible to use information included in each install log. The install log that each installer outputs is not particularly limited, and may include the name of the software, the version of the software, whether the installation has succeeded or has ended in failure, the error code when the installation has ended in failure, and/or the like.

The obtained log 168 shown in FIG. 8 is a single file in which the respective logs 162, 164 and 166 are collected according to the designated log items. However, it is also possible to create the obtained log(s) that is obtained from compressing the one or more logs output by the one or more installers 204 and 206 as they are without collecting them. In this case, the log counting server 140 which receives the logs may put the received logs in order according to the respective log items. Further, in a case where the size of the log information is large, it is preferable to compress the obtained log(s) 168. However, in a case where the information to be used by the server is small, the plural sets of log information may be transmitted separately without being collected. As specific examples of the information having a small size for which compressing it is not necessarily required, the following information may be cited, for example, i.e., information indicating whether the installation has succeeded or has ended in failure, the error code, the type of the software, the OS name and MAC address of the client, an environment ID that is generated from the MAC address, the version of OS and user ID according to a predetermined rule, and so forth.

Again referring to FIG. 4, the log transmission part 214 reads out the obtained log(s) 168 created by the log obtaining part 216, accesses the log counting server 140 according to the connection destination information for the log counting server obtained from the log collection setting information 210 and transmits the obtained log(s). When an authentication process for accessing the log counting server 140 is required, the authentication ID and the authentication password may be sent when the obtained log(s) is transmitted.

FIG. 7 is a flowchart of an installation process and a log transmission process subsequent thereto carried out by each client in which the installer package operates according to the first embodiment. The process shown in FIG. 7 is started from step S300 in response to an instruction being given by the operator of the client 160 through a "double clicking" operation or the like to execute the installer package. In step S301, the client 160 starts the install control program 202 included in the installer package 200. In step S302, the install control program 202 starts the one or more installers also included in the installer package 200, and waits for exit values from the respective installers in step S303.

In response to the starting of the installers in step S302, steps S310 through S312 are carried out for each of the installers 204 and 206, in sequence or in parallel. The respective installers 204 and 206 carry out their own installation processes in step S310, write the install logs 164 and 166 in step S311, and return exit values to the install control program 202 which is the calling origin. The install logs are preferably output in any one of a case where the installation processes have succeeded, a case where the installation process have been completed even though an error(s) has occurred on the way, and a case where the installation processes have been interrupted since an error(s) has occurred on the way. The exit values include values indicating whether the installation process has succeeded or has ended in failure.

In step S303, the install control program 202 determines whether having received the exit values from all the installers that have been started in step S302. When it has been determined in step S303 that there is an installer(s) that has not returned the exit value, step S303 is repeated in a loop, and waiting is carried out until the exit values have been received from all the installers. In a case where the exit values have been received from all the installers (step S303 YES), the process proceeds to step S304.

In step S304, the install control program 202 determines the results of the respective installation processes from the exit values obtained from the respective installers and creates a general log 162. In step S305, the collection setting reading part 212 of the install control program 202 reads out the log collection setting information 210. In step S306, the install control program 202 obtains the system information using, for example, Windows (registered trademark) API when the OS is of Windows (registered trademark), or using the method/property prepared for each particular development environment.

In step S307, the log obtaining part 216 of the install control program 202 collects the install logs 164 and 166 output by the respective installers 204 and 206 and the general log 162, and creates the obtained log according to the designated collection method. When compression is designated, all the files are collected and compressed. In step S308, the install control program 202 accesses the log counting server 140 designated by the IP address or URL that is obtained from the log collection setting information 210, using an authentication ID and an authentication password as the need arises, transmits the obtained log 168, and finishes the process in step S309.

Below, using FIGS. 4 and 9 through 12, a process will be described, which is carried out by the log counting server 140 in response to the installation processes and the log transmission processes subsequent thereto carried out by the clients. Again referring to FIG. 4, the log counting server 140 includes a log collection part 142, a log counting part 144, a log counting result reading part 146 and an install error counted data 148.

The log collection part 142 receives the obtained logs transmitted from the respective clients in which the installer packages 200 operate, and stores them in a storage unit of the log counting server 140. The collected obtained logs may be stored in the storage unit of the log counting part 140 for a certain period of time for the purpose of, in a case where there is a fear of an error in a program(s) or the like, transmitting the log information to and requesting the technical support or the development agency to solve the problem.

The log counting part 144 carries out counting based on the obtained logs stored in the storage unit, and stores the counting result as the install error counted data 148. The counting includes operations of classifying, according to predetermined items, the number of times of execution of installation, the number of times of successful installation and the number of times of errors. Specific examples of the above-mentioned predetermined item(s) for classifying may be those for classifying for respective types of OS, classifying for respective versions of OS, classifying for respective types of PC, classifying for respective types of drivers, classifying for respective versions of drivers, classifying for respective types of applications, classifying for respective versions of applications, classifying for respective network systems, and so forth. It is noted that details of the counting will be described later.

The log counting result reading part 146 reads the install error counted data 148, creates a report of a text format and a report including a graph(s) that are easy to visually understand by the system administrator (graph format), or any one thereof, and stores them in a manner to allow them to be read from the outside such as the administrator terminal 110. It is noted that a technique discussed in Patent reference No. 5 (mentioned later) may be applied to produce the graph(s) from the counting result.

Figure 9:
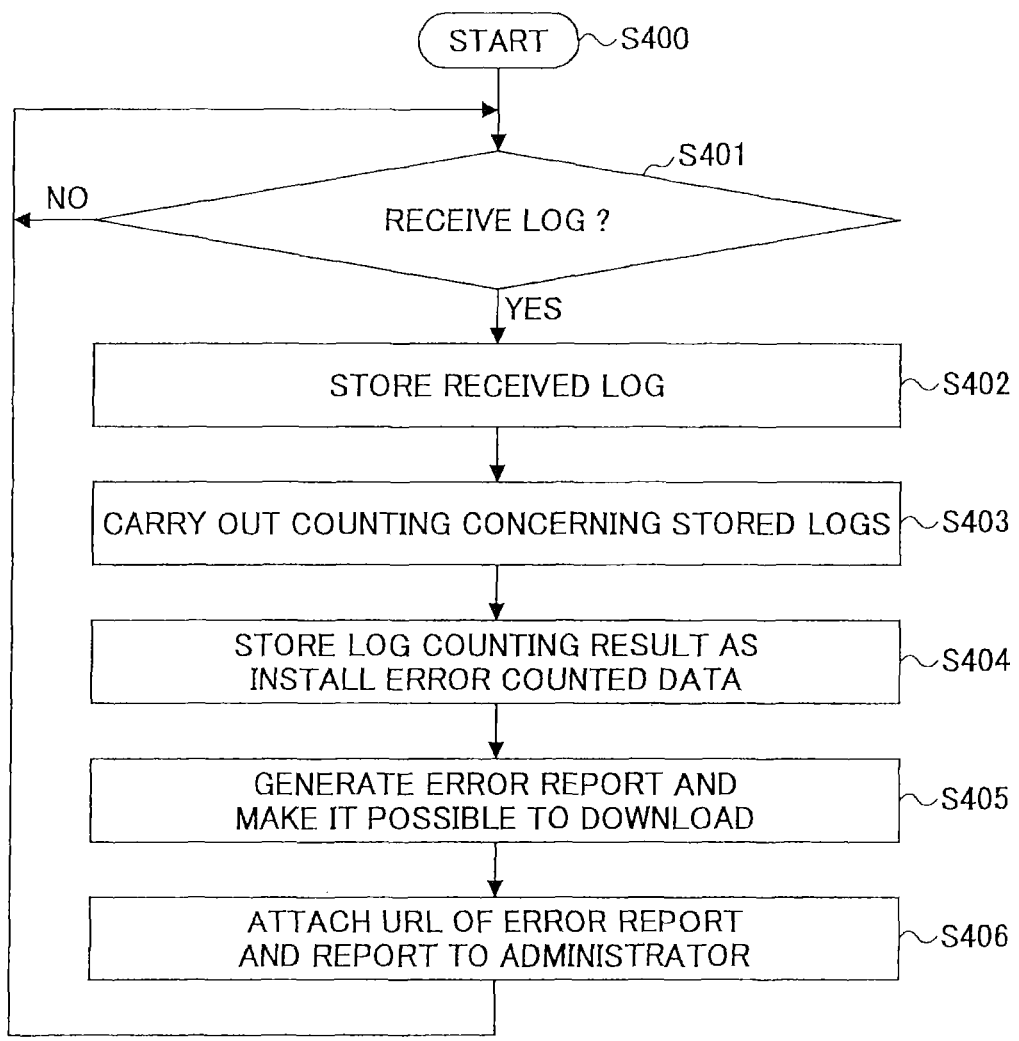
FIG. 9 is a flowchart of a sequence of processes from a log collection process through a report creation process carried out by the log counting server according to the first embodiment.

FIG. 9 is a flowchart showing a sequence of processes from the log collection process through the report creation process, carried out by the log counting server 140 according to the first embodiment. The process shown in FIG. 9 is started from step S400 in response to the log counting server 140 being started and starting a log collection service. In step S401, the log counting server 140 determines whether it has received a new obtained log. In a case of not having received a new obtained log (step S401 NO), step S401 is repeated as a loop, and waiting is carried out until a new obtained log has been received.

On the other hand, in a case where a new obtained log has been received (step S401 YES), the process proceeds to step S402. In step S402, the log collection part 142 of the log counting server 140 stores the received obtained log in the storage unit. In step S403, the log counting part 144 of the log counting server 140 reads out the stored obtained log, and carries out a counting process (log counting process). Details of the counting process will be described later. In step S404, the log counting part 144 of the log counting server 140 stores the log counting result obtained as a result of the log counting process as the install error counted data 148.

In step S405, the log counting result reading part 146 reads the install error counted data 148, creates an error report(s) in both a text format and a graph format or any one thereof, and stores them in the storage unit in a manner to allow them to be downloaded from the outside such as by the administrator terminal 110. In step S406, the log counting server 140 transmits a message that includes a download link (URL) for the error report in a form of an electronic mail, an instant message or the like to an address that is previously registered as a contact address of the administrator, and thus reports to the administrator. After thus reporting to the administrator in step S406, the process proceeds to step S401 in a loop manner, and waiting is carried out until another obtained log is received from any client.

The system administrator can understand an error occurrence trend at a time of the installation processes carried out by the delivered installer package 200 by reading the report created from the obtained log, as described above. For example, the administrator can understand that a driver not compatible to Windows (registered trademark) 7 may be included in the package when all the installation processes have succeeded with Windows (registered trademark) XP but all the installation processes have caused errors with Windows (registered trademark) 7. In such a case, the administrator may determine whether there is insufficiency in the packaging, a trouble in the installer(s), or the like. Further, by counting the events such as the number of times of execution of installation, the number of times of error occurrences, the number of times of successes and/or the like, it is possible to quantitatively understand events to occur.

Figure 10:
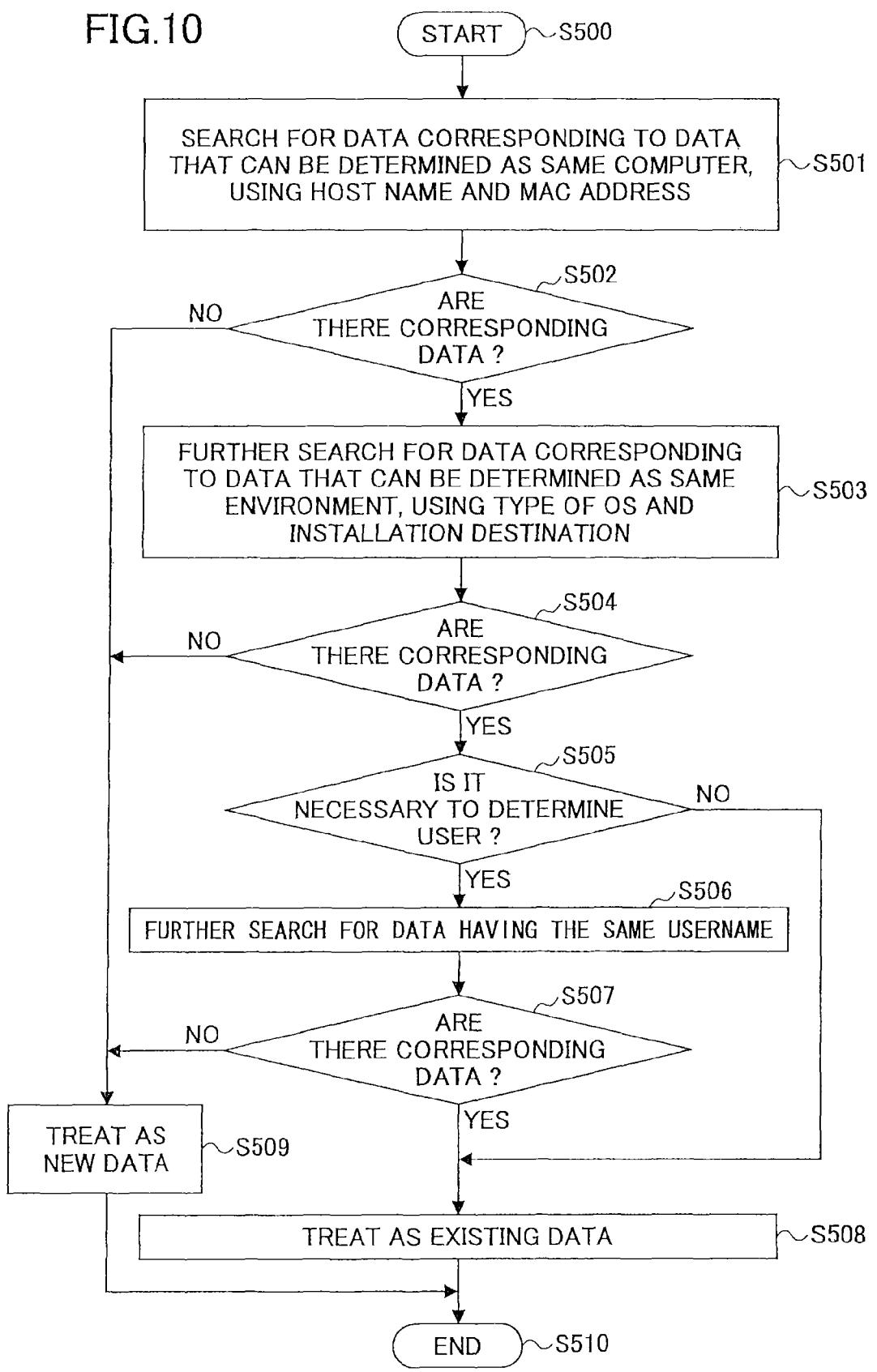
FIG. 10 is a flowchart of an event counting process while distinguishing computers, environments and users, carried out by the log counting server according to the first embodiment.

Below, using FIGS. 10 and 11, processes of counting respective events in the log counting process carried out by the log counting part 144 will be described. When the installation has ended in failure due to an error(s), the end user may repeat execution of installation for the same client. In such a case, there is a possibility that the counting result intended by the administrator cannot be obtained if the number of times of execution of installation is counted in the normal manner. In such a case, there may be a case where it is preferable to count the number of times of repetitively executed installation together as "one time" for the purpose of equally counting for a case where installation is tried while retrying is repeated many times and a case where installation is given up after only one time of failure.

On the other hand, there is a case where plural times of installation are carried out in the same physical client 160 in a case of, for example, dual-booting, a virtual machine or the like. Further, depending on an application, there is a case where installation is requested to be carried out for each user, and thus, an installation process is carried out plural times for the respective users in the same client. It is preferable to count installation processes, for a case where environments are different or users are different, at the respective times for the different environments or the different users, instead of counting them in one time.

Below, processes of counting the number of times of installation, the number of times of successes and the number of times of errors, while distinguishing computers, environments and users, will be described. FIG. 10 is a flowchart showing a process of counting events while distinguishing computers, environments and users. The process shown in FIG. 10 is started from step S500 for each of the obtained logs.

In step S501, the log counting part 144 searches for a record(s) determined as corresponding to the same computer from among the record(s) of the existing obtained log(s) using as keys the host name and the MAC address included in the newly collected obtained log. The reason why the host name and the MAC address are thus combined to use is to distinguish the execution environments even in a case where a network interface card has been exchanged. Thus, in this case, when at least any one of the host name and the MAC address of a record of the existing obtained log(s) is different from that of the newly collected obtained log, the record of the existing log(s) is determined as not corresponding to the same computer, and thus, is determined as corresponding to a different execution environment from the new obtained log. According to the first embodiment, the host name and the MAC address are thus used. However, according to another embodiment, another item of system information, such as UUID, may be used instead, as long as it is possible to determine that plural computers are the same.

Further, in a case where plural virtual machines operate in a single physical machine under a system virtualization environment, it is not possible to distinguish the virtual machines by using the type of OS or a path of installation destination described later. Thus, the virtual machines are determined as separate computers from the host names and the MAC addresses. For example, according to VMWare (registered trademark), network adapters having independent MAC addresses are assigned to respective virtual machines, and thus, it is possible to distinguish the execution environments from the MAC addresses. On the other hand, according to VirtualPC (registered trademark), the MAC address of a guest OS is the same as that of a host OS. However, also in this case, it is possible to distinguish the execution environments from the host names.

In step S502, the log counting part 144 determines, from the result of the search in step S501, whether there is a corresponding record(s) in the existing obtained log(s). In a case where it has been determined that there is no corresponding record (step S502 NO), the search is finished, and the process proceeds to step S509 in a branching manner. In this case, since there is no record from the same computer, the log counting part 144 treats the new obtained log as new data, counts the number of times of installation, the number of times of successes, the number of times of errors and so forth in step S509, and finishes the process in step S510. It is noted that to treat the new obtained log as new data means to treat the new obtained log as not corresponding to any execution environment of the existing obtained log(s).

On the other hand, in a case where it has been determined in step S502 that there is a corresponding record(s) (YES), the process proceeds to step S503. In step S503, the log counting part 144 searches for a record(s) determined as corresponding to the same environment from among the record(s) of the existing obtained log(s) obtained in step S501, using as keys the type of OS and the path of the installation destination included in the system information of the new obtained log. The reason why the type of OS and the path of the installation destination are used is to deal with a multiboot environment. When the type of OS is different, it is possible to determine as a different environment. Even when the type of OS is the same, it is possible to determine as a different environment when the path of the installation destination is different.

In step S504, the log counting part 144 determines from the search result of step S503 whether there is a corresponding record(s). In a case where it has been determined that there is no corresponding record (step S504 NO), the log counting part finishes the search, treats the new obtained log as new data in step S509, and finishes the process in step S510.

On the other hand, in a case where it has been determined that there is a corresponding record(s) (step S504 YES), the process proceeds to step S505. In step S505, the log counting part 144 determines whether it is necessary to carry out user determination for the purpose of distinguishing the installation environment since the installation may be carried out for each user, or the like. In a case where it has been determined that it is necessary to carry out user determination (step S505 YES), the process proceeds to step S506. In step S506, the log counting part 144 further searches for a record(s) determined as corresponding to the same user from among the record(s) of the existing obtained log(s) obtained in step S503, using as a key the username included in the system information of the new obtained log.

In step S507, in a case where it has been determined from the result of the search of step S506 that there is no corresponding record (NO), the new obtained log is treated as new data in step S509, and the process is finished in step S510. On the other hand, in a case where it has been determined from the result of the search of step S506 that there is a corresponding record(s) (step S507 YES), the process proceeds to step S508. In step S508, the log counting part 144 finishes the search, treats the new obtained log as existing data, counts the number of times of installation, the number of times of successes, the number of times of errors and so forth, and finishes the process in step S510. It is noted that to treat the new obtained log as existing data means to treat the new obtained log as corresponding to the same execution environment as at least any one of the execution environment(s) of the existing obtained log(s).

Again referring to step S505, in a case where it has been determined that it is not necessary to carry out user determination (step S505 NO), the process directly proceeds to step S508 in a branching manner since it is not necessary to distinguish the user. In step S508, the log counting part 144 finishes the search, treats the new obtained data as existing data, and finishes the process in step S510. For example, in a case of a driver or an application which is used in common for all the users, it is not necessary to carry out user determination.

FIG. 11 illustrates a result of counting the number of times of installation and so forth created by the event counting process in installation according to the first embodiment. In the example shown in FIG. 11, a user A has carried out downloading 1 time, and has carried out installation 5 times wherein errors have occurred in 3 times thereof, and two times thereof have succeeded. It is noted that the above-mentioned number of times of installation, number of times of errors and number of times of successes (of an "install counter", shown in FIG. 11) are a result of counting without distinguishing the execution environment of the client. Further, the above-mentioned number of times downloaded is previously determined by the administrator.

On the other hand, referring to "environment counter" (distinguishing the execution environment) of FIG. 11, the number of times of installation of the user A distinguishing the environment is 1 time. Therefrom, it can be seen that all of the above-mentioned 5 times of installation have been carried out in the same execution environment, and thus, the 5 times of installation is counted as 1 time when counting while distinguishing the environment. Further, when counting while distinguishing the environment, each of both the number of times of errors and the number of times of successes of the user A is 1 time, as shown in FIG. 11.

Thus, in the example of FIG. 11, each of the number of times of errors and the number of times of successes are collected together into 1 time for the same environment. The reason therefor is to weight equally the count of a case of having carried out retry of installation several times and a case of having given up after 1 time of failure. In fact, if the number of times of repetitive installation were counted as one time respectively, the weight would increase although the errors have occurred only in one environment, and thus, the errors would be overestimated. This is because it is considered that occurrences of 5 times of errors in five different environments should be dealt with preferentially than the occurrences of 5 times of errors in the same environment.

Further referring to FIG. 11, for a user B, the number of times downloaded is 3 times. However, the number of times of installation is only one time. In this case, there is a possibility that a failure has occurred during downloading, or installation has been carried out in a client which is out of a managed area, for example, which is not connected with the server. By using counted data such as that shown in FIG. 11, the administrator can understand that client management may be insufficient or can find behavior suspected to correspond with improper usage.

Further, referring to FIG. 11, for a user C, the number of times downloaded is 1 time, and installation has been carried out 5 times wherein errors have occurred in all of these times. Referring to the environment counter, it can be seen that installation has been carried out in 5 different environments, and all thereof have caused errors. In this case, from the result shown in FIG. 11, the administrator can find the possibility of a serious problem having occurred, and can rapidly take measures such as investigating the delivered package itself for mistakes, or the like.

Figure 12:
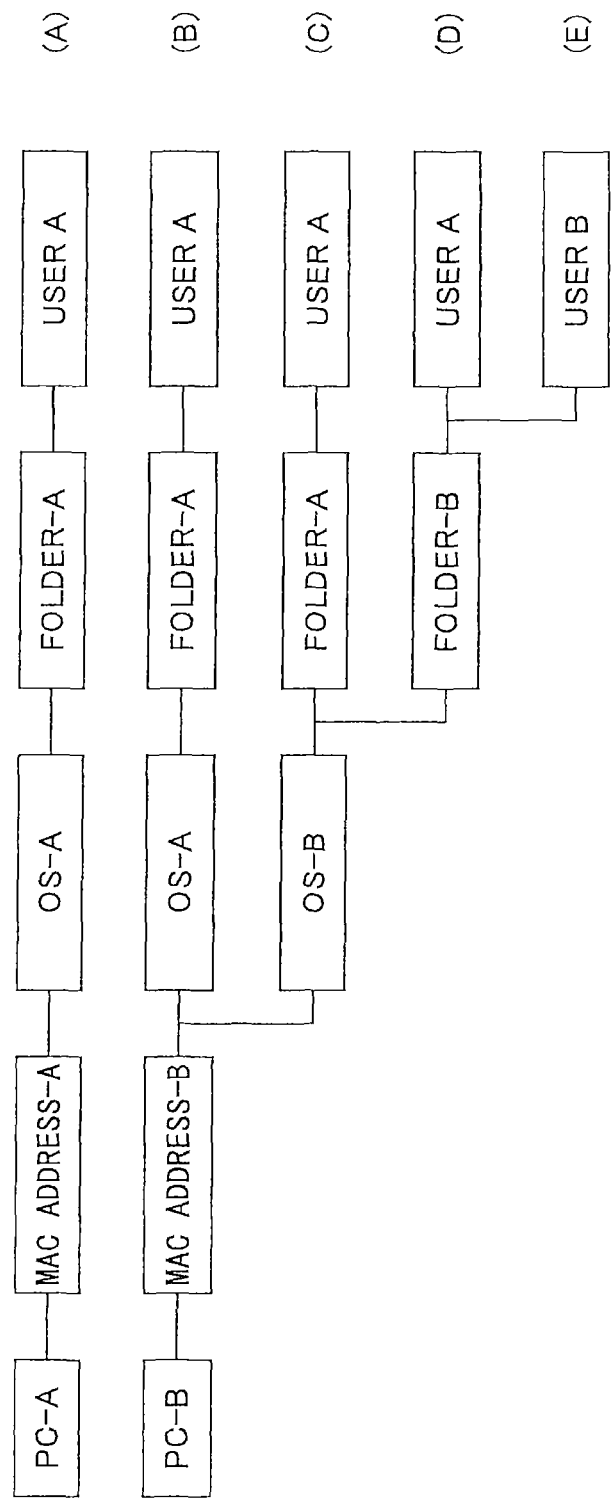
FIG. 12 illustrates client execution environments distinguished in the event counting process according to the first embodiment.

FIG. 12 illustrates client execution environments that are distinguished in the above-mentioned counting process. According to the counting process described above, it is possible to distinguish respective client execution environments of different computers (PC-A ad PC-B) as (A) and (B) of FIG.

12. Further, according to the counting process described above, it is also possible to distinguish respective client execution environments of different OSes (OS-A and OS-B) in the same computer (also in the same NIC) as (B) and (C) of FIG. 12. Further, according to the counting process described above, it is also possible to distinguish respective client execution environments of different paths of installation destinations (folder-A and folder-B) in the same OS in the same computer as (C) and (D) of FIG. 12. Further, according to the counting process described above, it is also possible to distinguish respective client execution environments of different users (user A and user B) in the same path of the installation destination in the same OS in the same computer as (D) and (E) of FIG. 12.

Thus, as described above, according to the first embodiment, it is possible to provide to a system administrator a report indicating a counting result obtained from an install log(s) from an installation process(es) using an installer package 200 that is created by the packager 112. Further, according to the first embodiment, log collection is carried out including collection of information for distinguishing client execution environments, and counting can be carried out while distinguishing the execution environments. Thus, the administrator can understand an error occurrence trend such as those as to how many operators have come across errors from among all the operators, which environment has an error occurring from among plural environments, and/or the like, from the report in which the importance of errors is thus properly reflected. Furthermore, it is possible to implement countermeasure for the future, for example, to efficiently estimate the number of man hours required for delivering packages for next time.

Below, using FIGS. 13 through 17C, processes will be described from delivery of a package(s) through counting from a log(s) according to a second embodiment. It is noted that the second embodiment described below includes parts having functions the same as or similar to those of the first embodiment described above using FIGS. 1 through 12, and thus, description of the second embodiment will be mainly made for points of difference.

Figure 13:
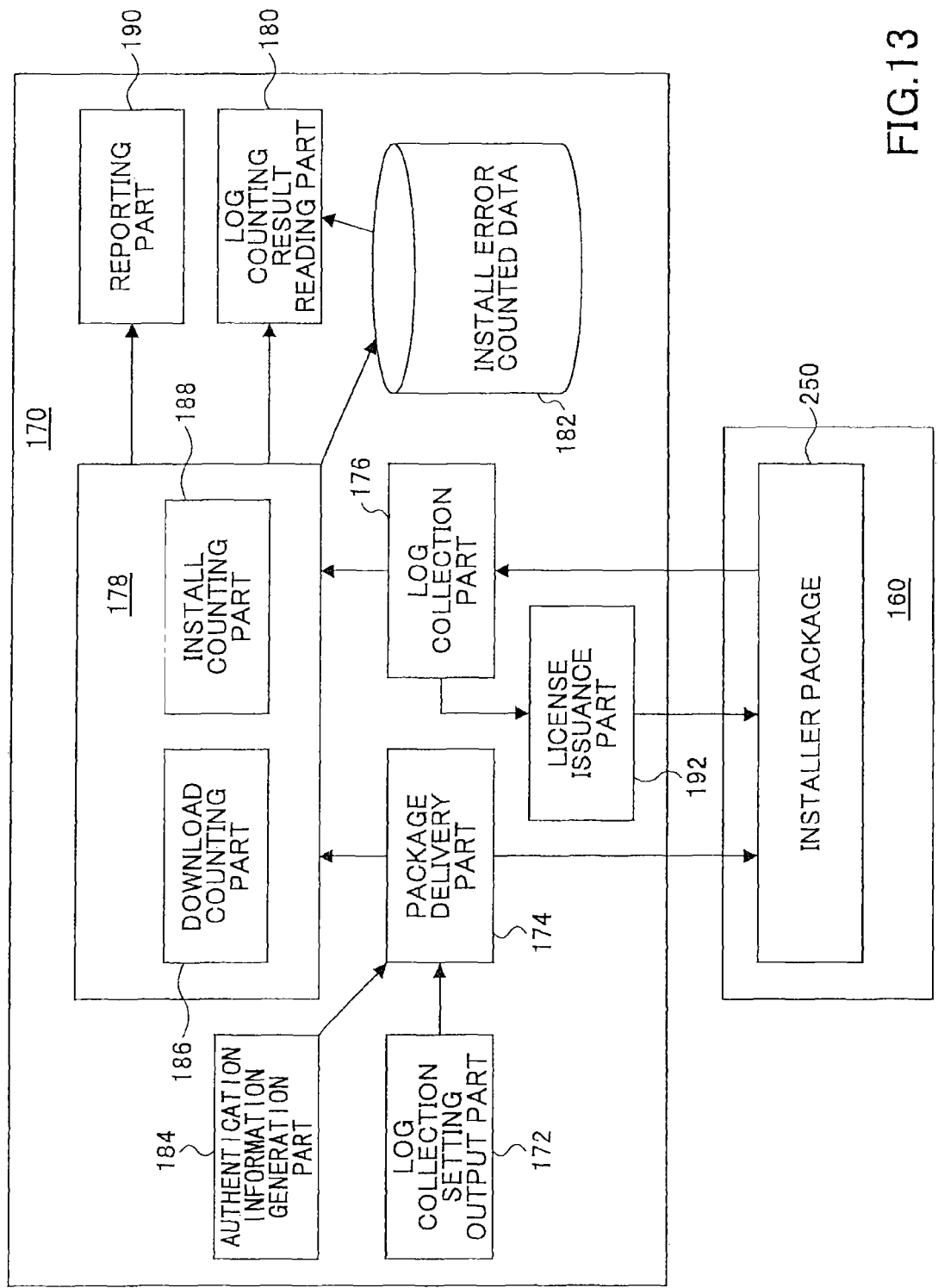
FIG. 13 shows functional blocks realized by a package delivery and log counting server and a client according to a second embodiment.
Figure 14:
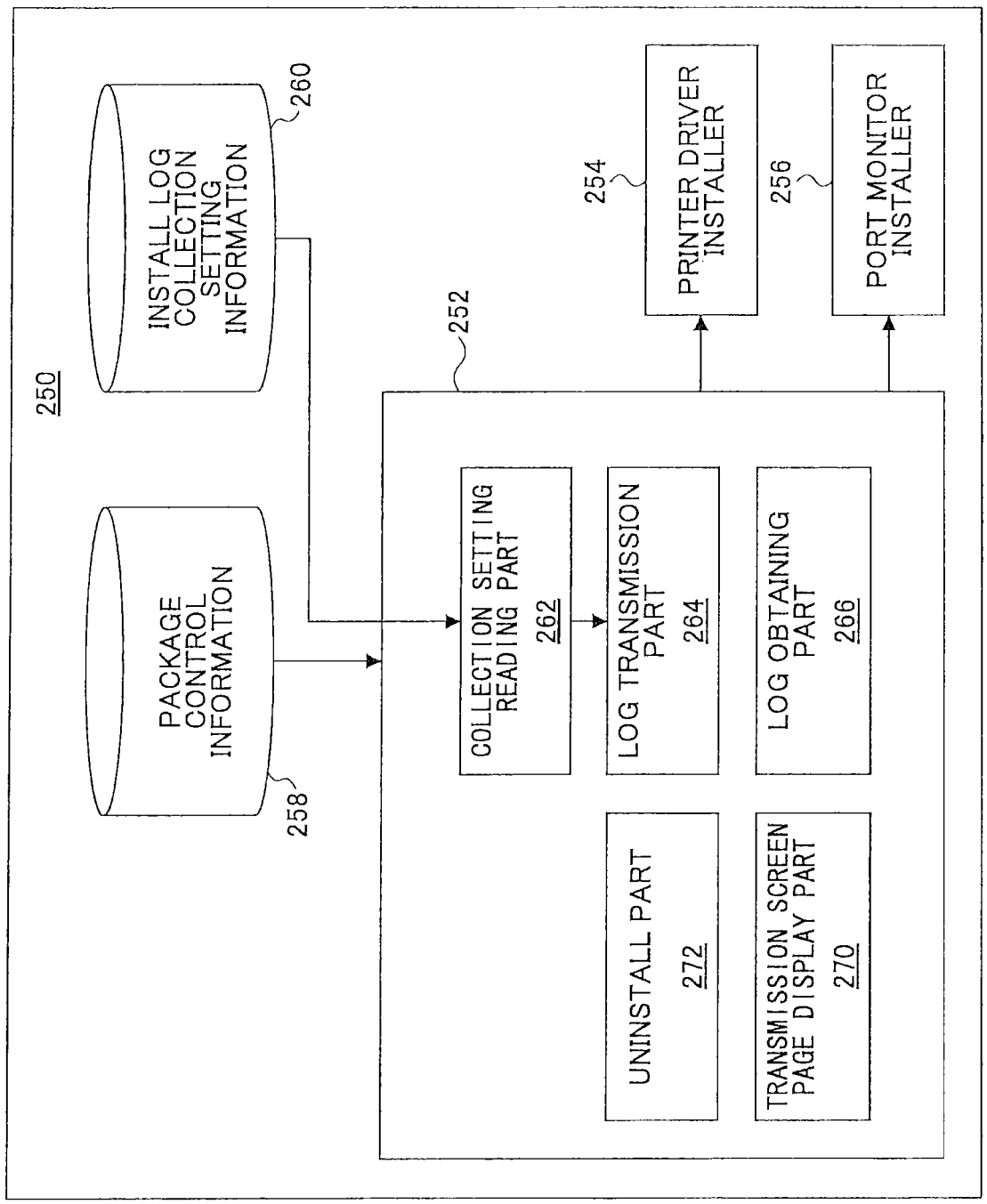
FIG. 14 shows detailed functional blocks of an installer package according to the second embodiment.

FIG. 13 shows functional blocks realized in a package delivery and log counting server and a client according to the second embodiment. FIG. 14 shows detailed functional blocks realized in an installer package 250 according to the second embodiment.

FIG. 13 shows a package delivery and log counting server 170 (simply referred to as a "delivery and counting server", hereinafter) and an installer package 250 that operates in a client 160. The delivery and counting server 170 according to the second embodiment is configured approximately as a server having functions of the package delivery server 130 and the log counting server 140 according to the first embodiment in an integrated manner. The delivery and counting server 170 includes, the same as those of the first embodiment, a log collection setting output part 172, a package delivery part 174, a log collection part 176, a log counting part 178, a log counting result reading part 180 and an install error counted data 182. The delivery and counting server 170 further includes an authentication information generation part 184 and a reporting part 190.

Referring to FIG. 14, in the installer package 250, an install control program 252 includes, approximately the same as those of the first embodiment, a collection setting reading part 262, a log transmission part 264 and a log obtaining part 266. The install control program 252 according to the second embodiment further includes a transmission screen page display part 270 and an uninstall part 272.

The log collection setting output part 172 shown in FIG. 13 outputs log collection setting information 260 to the installer package 250, the same as the first embodiment. The package delivery part 174 stores the installer package 250 in a storage unit in a manner to allow it to be downloaded and delivers it in response to a request from each client 160, the same as one shown in FIG. 4. According to the second embodiment, the package delivery part 174 further has a function of providing a download log to the log counting part 178 for counting the number of times downloaded.

The same as the first embodiment, the log counting part 178 receives an obtained log(s) that is transmitted from each client 160 in which the installer package 250 operates, carries out counting from the thus collected obtained log(s), and stores the counting result as the install error counted data 182.

In further detail, the log counting part 178 according to the second embodiment includes a download counting part 186 and an install counting part 188. The download counting part 186 carries out counting from the download log(s) that is given by the package delivery part 174 as part of the above-mentioned counting process, and thus, counts the number of times downloaded. As a result of the log collection part 176 thus obtaining the download log(s) from the package delivery part 174 and counting the number of times downloaded, counting for the "download counter" shown in FIG. 11 can be carried out in the deliver and counting server 170.

The install counting part 188 counts the number of times of installation, the number of times of errors and the number of times of successes while distinguishing the above-described client execution environments, as part of the above-mentioned counting process. Further, according to the second embodiment, it is possible to count the number of times the installer package 250 is downloaded. Thus, it is possible to calculate the respective ratios of the number of times of execution of installation, the number of times of successes and the number of times of errors to the number of times the installer package 250 is downloaded. Thus, the system administrator can understand whether everyone has downloaded the installer package and has finished the setup thereof, or how many users have not completed the setup yet. Further, it is also possible to understand that errors have started to occur, estimate a change in a trend of occurrences of errors, and also determine countermeasures such as contacting a technical support.

The log counting result reading part 180 reads the install error counted data 182, creates a report and stores it in a manner to allow it to be read from the outside, the same as the first embodiment. The install error counted data 182 according to the second embodiment includes, in addition to the counting result of the install log(s), the counting result of the download log(s).

The authentication information generation part 184 generates an authentication password at a time of the delivery (i.e., at a time of the downloading), embeds it in the installer package 250 to be downloaded, and registers authentication information for authenticating the client in the server. The authentication password is generated, for example, using a pseudo random number or the like, based on the username of the user who has logged in, the date of logging in and/or the like.

The reporting part 190 responds to the counting result of the log counting part 178, and, in a case where a predetermined reporting condition has been met, reports to a registered contact address such as the administrator, the development agency or the like that the reporting condition has been met. As the reporting condition, one previously set by the administrator can be used. For example, the administrator can receive the reporting each occurrence of an error, or can receive the reporting when errors have occurred a predetermined number of times concerning a certain installer package 250. Further, in a case where the number of times of installation can be estimated from the number of times downloaded, a threshold may be set for the error occurrence ratio instead of the number of times of errors.

Referring to FIG. 14, the installer package 250 includes the transmission screen page display part 270 and the uninstall part 272. According to the second embodiment, the transmission screen page display part 270 and the uninstall part 272 are used in a case where the log transmission part 264 cannot automatically transmit an obtained log(s) due to a reason concerning a security policy of a network environment or a network factor.

The transmission screen page display part 270 displays a log transmission screen page on a display device of the client 160 for receiving an instruction to transmit install logs after processes of respective installers 254 and 256 have been completed. The uninstall part 272 again calls the respective installers 254 and 256 to uninstall the respective sets of software and return to the previous states before the installation of the software, in a case where the log transmission using the above-mentioned log transmission screen page has not been completed and the installation processes have been interrupted.

The install control program 252 calls the transmission screen page display part 270 and causes it to display the log transmission screen page such as that shown in FIG. 15A, 15B, 16A or 16B, in a case where the obtained log(s) cannot be automatically transmitted by the log transmission part 264, after the lump-sum installation processes have been finished.

Figure 15A:
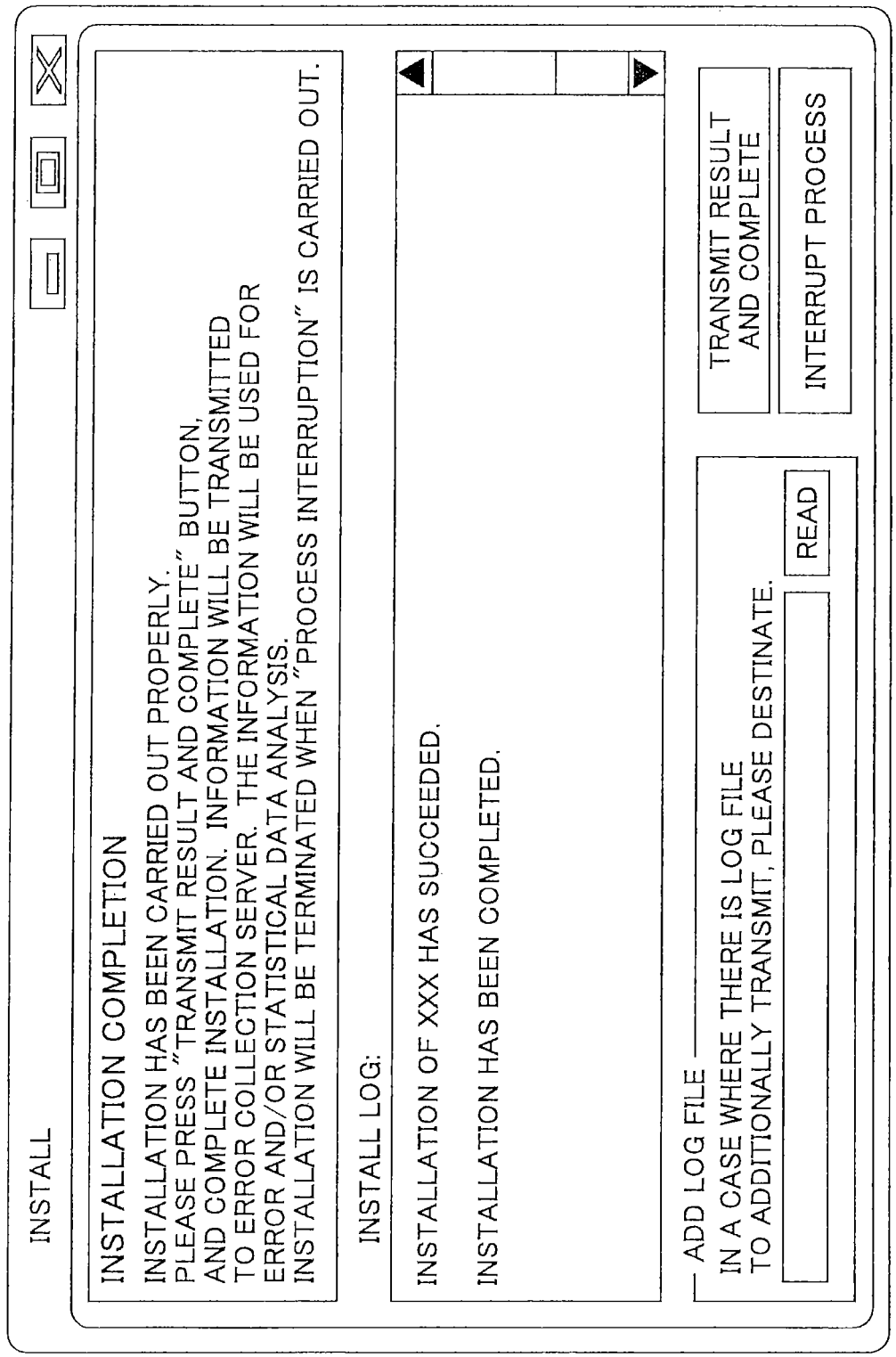
FIGS. 15A and 15B illustrate log transmission screen pages according to the second embodiment.
Figure 15B:
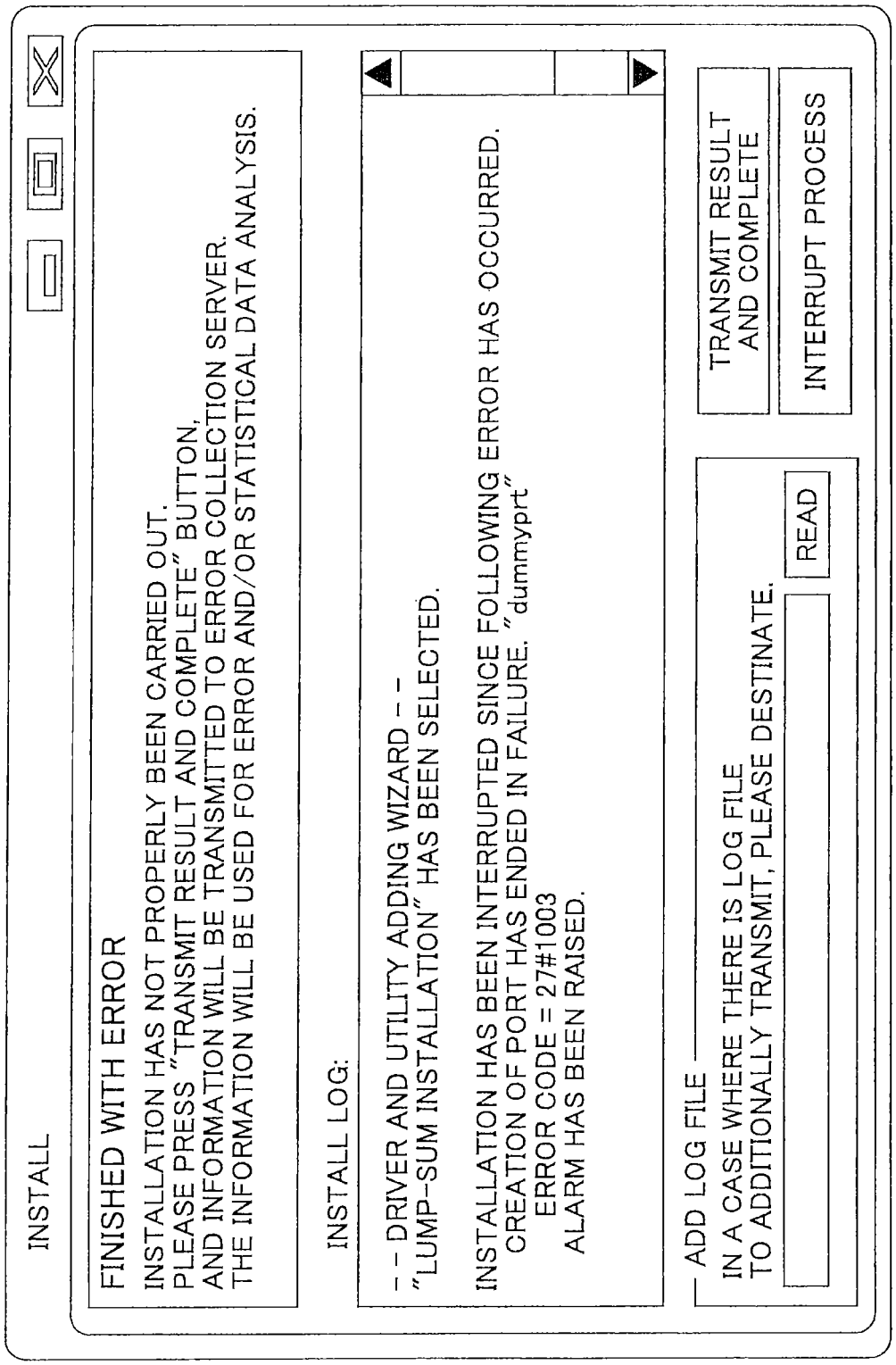

FIG. 15A illustrates the log transmission screen page displayed in a case where the installation has succeeded. FIG. 15B illustrates the log transmission screen page displayed in a case where the installation has ended in failure. In the transmission log screen pages shown in FIGS. 15A and 15B, in the text boxes of "install log", the contents of the respective install logs that are output by the installers 254 and 256 and the general log that is output by the install control program 252 have been previously input.

Usually, the installer package 250 is a collection of plural installers, and generally speaking, install logs are output separately for the respective installers. Thus, according to the second embodiment, in order to display the log transmission screen page in a state in which the contents of the install logs and the general log have been previously input, "output log setting information" that prescribes an output log (the contents to be thus previously input in the log transmission screen page), such as those illustrated in FIGS. 17A through 17C, is incorporated in the package control information 258.

The item "LOG_TYPE" in FIGS. 17A, 17B and 17C is an item in which a value that designates a type of a log collection method is input. The specific value "FOLDER" in FIG. 17A is a value designating that the above-mentioned text box of "install log" is to include all the data included in the designated folder (indicated by "LOG_PATH=c:¥xxx¥ log ¥"). The specific value "SINGLE_FILE" in FIG. 17B is a value designating that the above-mentioned text box of "install log" is to include the contents of a single file (indicated by "FILE_NAME=ABC*.log") included in the designated folder (indicated by "LOG_PATH=c:¥xxx¥ log ¥"). The value "MULTIPLE_FILE" in FIG. 17C is a value designating that the above-mentioned text box of "install log" is to include the contents of plural files (indicated by "FILE_NAME=ABC*.*") included in the designated folder (indicated by "LOG_PATH=c:¥xxx¥ log ¥").

The item "LOG_PATH" in FIGS. 17A, 17B and 17C is an item in which a path by which the contents to be included in the above-mentioned text box of "install log" are obtained ("log output path") is input. The log output path may be designated by a specific path (c:¥tmp), and also, may be designated by a predetermined keyword such as "WIN_TEMP", "USER_LOCAL_TEMP" that indicates a predetermined folder, or the like. The item "FILE_NAME" is an item in which a naming rule for a log file(s) (a file(s) having the contents to be included in the above-mentioned text box of "install log") is input. The log file(s) may be designated by a specific log file name (for example, "ABC.log" or the like), and may also be designated by a wildcard or a regular expression (for example, "ABC*.log", or the like).

The transmission screen page display part 270 reads the above-mentioned "output log setting information" included in the package control information 258, obtains the log file(s) designated by the "output log setting information", and creates the log transmission screen page in which the install logs and general log have been previously input. It is noted that in a case where there is another indispensable matter(s) to be input in the log transmission screen page, it is possible to make the operator of the client 160 manually input it (them). Further, from the viewpoint of eliminating the end user's trouble, it is preferable to provide a state in which such log information has been initially input in the log transmission screen page. However, it is also possible to make the end user manually designate a part(s) of the install logs and general log, using a form to designate a file(s) (file designation form), for example. By thus making it possible to manually designate a log file(s), it is possible to collect an install log(s) and a general log even in a case where the contents of an install log(s) and a general log cannot be previously determined. Also, by thus making it possible to manually designate a log file(s), it is possible to collect the system information that is not output by an installer(s) and/or information obtained by using another tool.

Figure 16A:
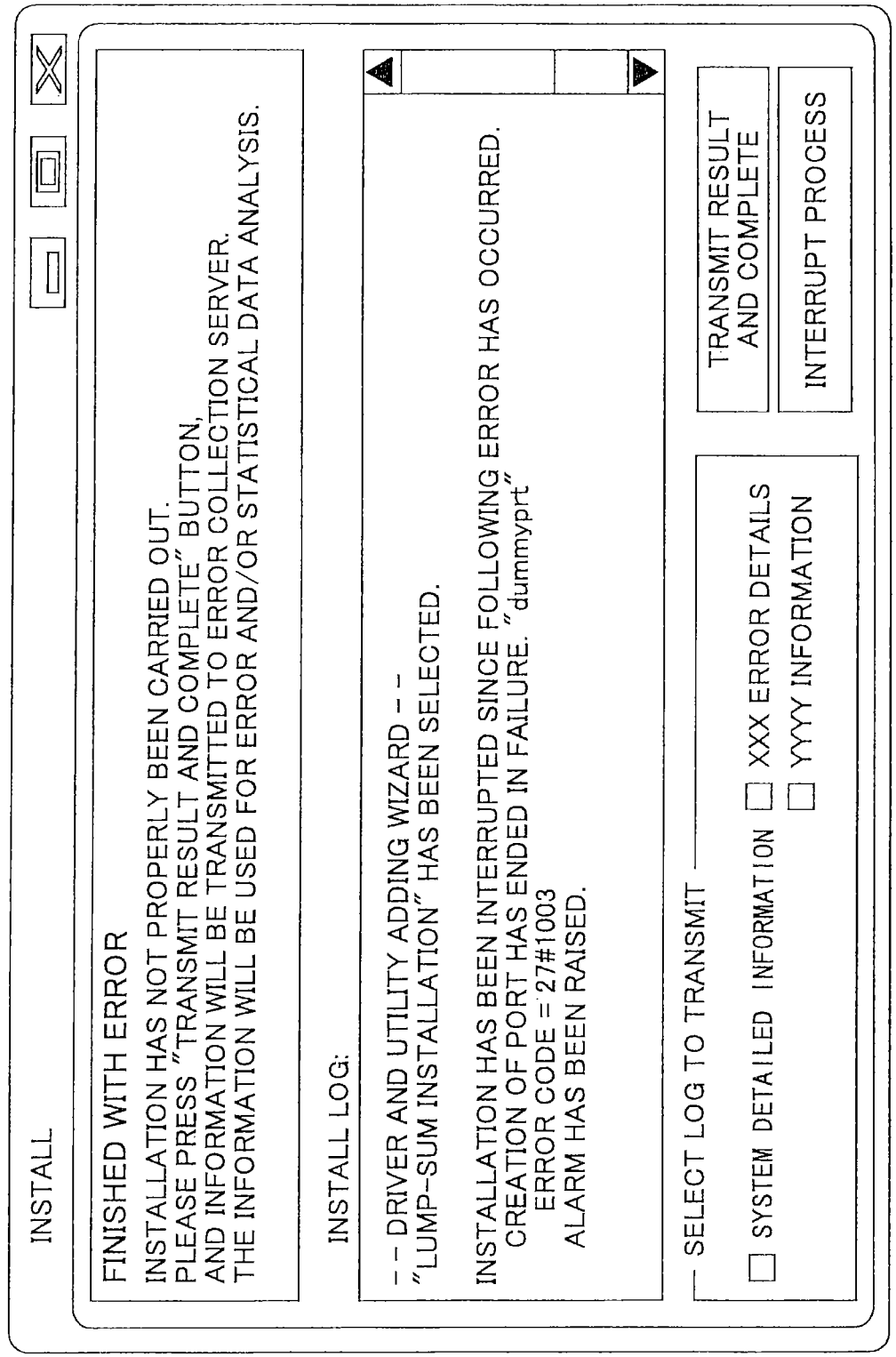

Further, there may be a specific way of applying the log transmission in a case where the client(s) 160 and the delivery and counting server 170 are located at different companies. In such a case, all the log information is transmitted from the client(s) 160 to the outside of the company of the client(s) 160, and there may be a case where such a way of applying the log transmission is not preferable from the viewpoint of a security policy. FIGS. 16A and 16B shows other examples of the log transmission screen page which can be used in such a situation. In the log transmission screen page in the example shown in FIG. 16A, a UI part (check box "SELECT LOG TO TRANSMIT") is displayed by which it is possible to select the contents to be transmitted as log information.

By displaying the log transmission screen page shown in FIG. 16A, the end user who uses the installer package 250 is allowed to select the transmission contents, and it is also possible to make sure to transmit the minimal log information. According to another embodiment, in a case where log items to be transmitted can be previously determined between the client(s) 160 and the delivery and counting server 170, the end user is not allowed to freely select the log items and therefore the necessary log information is still transmitted. In this case, log items which can be transmitted may be defined in the package control information 258.

As described above, the installer package 250 is a collection of one or more installers. There is a case where an installation process of the package includes plural steps. As shown in the log transmission screen page shown in FIG. 16B, it is also possible that whether to transmit an error log can be determined for each step. For example, it is possible to reduce the network traffic by only reporting an error concerning the step(s) of installation which has ended in failure.

Figure 18:
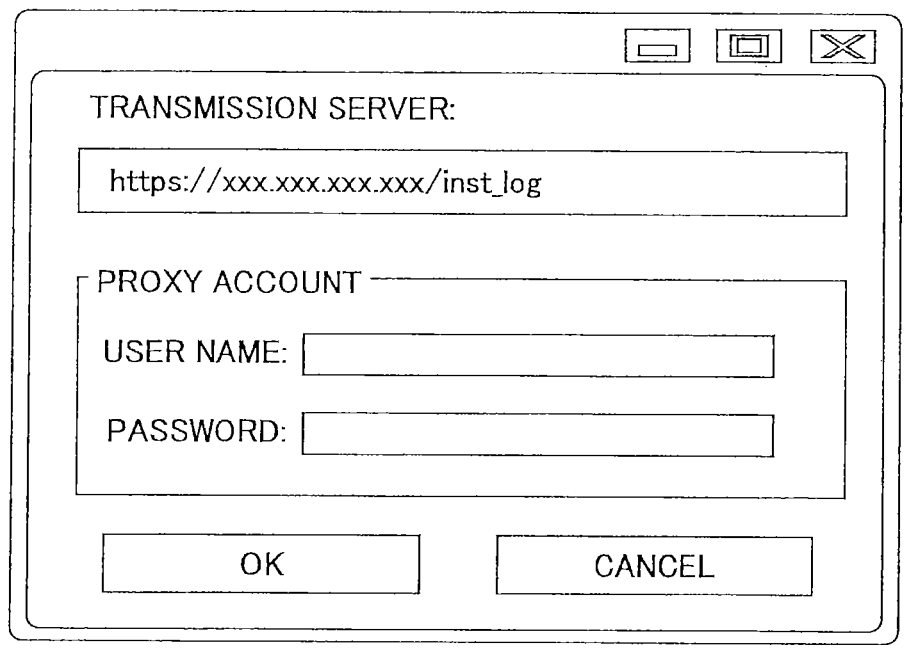
FIG. 18 illustrates a log transmission authentication screen page according to the second embodiment.

When a button of "transmit result and complete" is clicked in the state in which the log information, and other necessary information, if any, have been input in the log transmission screen page such as that shown in FIG. 15A, 15B, 16A or 16B, the log information is transmitted via a log transmission authentication screen page such as that shown in FIG. 18. In this case, the install control program 252 creates the obtained log(s) after adding information thereto, as the need arises, in addition to the contents included in the text box(es) of the log transmission screen page, transmits it to the delivery and counting server 170, and completes the lump-sum installation process successfully.

On the other hand, in a case where transmission of log information using the above-mentioned log transmission screen page has not been properly completed and the installation process has been interrupted as a result of the "interrupt process" button on the log transmission screen page being clicked, the "transmit result and complete" button being clicked while the text box(es) and/or the file designation form are left blank, or the like, the install control program 252 calls the uninstall part 272, and returns to the previous state before the installation of the software. Thus, it is possible to make the end user transmit the log information concerning installation without fail.

It is noted that according to the second embodiment described above, uninstall is carried out in a case where transmission of log information using the log transmission screen page cannot be completed properly. According to another embodiment, in a case where the authentication information has been inconsistent between the time of delivery and the time of collecting log information, it is also possible to determine that the installation process(es) including transmission of log information has not been completed, call the uninstall part 272 and return to the previous state before the installation of the software.

Further, it is possible to apply a security policy such as setting an installation deadline, by using a control method of, in a case where an authentication error occurs at a time of transmitting the log information, causing the installers 254 and 256 included in the package to carry out uninstallation. For example, by changing an authentication password every certain interval, inconsistency of authentication information may occur between the time of delivery and the time of transmitting log information may occur. In such a case, the administrator can determine that an unauthorized action may be carried out. Thereby, it is possible to improve the security in the lump-sum installation using the installer package in addition to efficient collection of installation errors. Further, it is also possible to provide a utility of urging the end user to carry out the installation within a predetermined period of time.

Further, according to the above-described second embodiment, the log transmission screen page is displayed as a window. However, it is not necessary to limit to this way, and according to another embodiment, it is also possible to provide a configuration to call an existing browser and display a dedicated web page for transmitting log information concerning installation.

Again referring to FIGS. 13 and 14, processes from delivery of a package(s) through counting from log information according to further another embodiment are also shown. According to an embodiment described below, the delivery and counting server 170 further includes a license issuance part 192, and the delivery and counting server 170 has a function of managing licenses of software.

The license issuance part 192 carries out a procedure of issuing a license code to the client after the completion of an installation process by each installer. The license code is a code for making the installed software valid. According to the embodiment including the license issuance part 192, the install control program 252 transmits a license code obtaining request including the obtained log(s) when transmitting the obtained log(s) to the delivery and counting server 170. The license issuance part 192 carries out authentication of the client 160 using license authentication information, which client has requested to obtain the license code, and determines whether to allow issuance of the license code. When having determined to allow issuance of the license code, the license issuance part 192 transmits the license code to the client 160 as a response to the request to obtain the license code.

After thus having obtained the license code, the install control program 252 according to the embodiment including the license issuance part 192 sets the license code to the installed software. On the other hand, when having failed in obtaining the license code, the install control program 252 may call the uninstall part 272, uninstall the respective sets of software, and return to the previous state before the installation of the software.

The above-mentioned request to obtain a license code and transmitting the license code may be carried out according to any protocol. When a simple method is to be used, it is possible to carry out the requesting to obtain a license code and transmitting the license code using an electronic mail. In this case, the obtained log(s) and the license authentication information which are described according to a predetermined format(s) are included in the electronic mail as a body text or an attached file. When the electronic mail of the license authentication information has been transmitted to a predetermined address, the delivery and counting server 170 receives the electronic mail, analyzes it according to the predetermined format(s), and extracts the license authentication information and the obtained log(s). The delivery and counting server 170 may include a mail transmission part which, in a case where the conditions for issuing the license code are met, transmits to the return address of the electronic mail an electronic mail that includes the license code to make at least one of one or more sets of software installed by one or more installers valid.

By the above-described configuration, it is possible to transmit an obtained log(s), accompanying a license obtaining procedure, without requesting the end user to carry out manual operation using a log transmission screen page, even when it is not possible to automatically connect to a delivery and counting server.

As described above, according to the embodiments, it is possible to provide a log counting program for realizing by a computer a log counting apparatus by which it is possible to efficiently collect log information that describes errors and/or the like occurring, if any, during installation processes for software using an installer package(s) in a delivery destination client(s), and carry out counting from the log information while distinguishing an execution environment(s) of the delivery destination client(s). Further, it is also possible to provide the log counting apparatus itself and an installer packager program that causes a computer to function as a package creation apparatus to create the installer package(s).

It is noted that the above-mentioned functional parts (functional blocks) can be realized by a computer executable program described by any one of legacy programming languages and object oriented programming languages such as assembler, C, C++, C#, Java (registered trademark) and so forth. The computer executable program may be delivered in a state of being stored in a computer-readable information recording medium such as a ROM, an EEPROM, an EPROM, a flash memory, a flexible disk, a CD-ROM, a CD-RW, a DVD-ROM, a DVD-RAM, a DVD-RW, a blu-ray disc, a SD card, a MO or the like, or may be delivered using an electric telecommunication line.

Thus, the computer readable information recording medium, the log counting apparatus and the package creation method have been described by the embodiments. However, the present invention is not limited to these specifically disclosed embodiments, and variations and modifications (which may include addition, changes, deletion and/or the like) may be made and any other embodiments may be devised within the scope the persons skilled in the art can devise. Any embodiments are included in the scope of the present invention as long as the functions and the advantageous effects of the present invention are obtained.

The present application is based on Japanese priority application No. 2011-151903 filed on Jul. 8, 2011, the entire contents of which are hereby incorporated herein by reference.

PATENT REFERENCES

Patent reference No. 1: Japanese Patent No. 4537670
Patent reference No. 2: Japanese Patent No. 4375778
Patent reference No. 3: Japanese Laid-Open Patent Application No. 2006-350896
Patent reference No. 4: Japanese Laid-Open Patent Application No. 2004-185084
Patent reference No. 5: Japanese Laid-Open Patent Application No. 2010-049363

What is claimed is:

1. A non-transitory computer readable information recording medium storing a computer executable log counting program which, when executed by a computer, functions as a log counting apparatus that is capable of communicating with a client apparatus via a communication network, the log counting program causing the computer to function as:
a log collection part that collects log information from the client apparatus in which an installer package operates; and
a log counting part that carries out counting concerning the collected log information, wherein
the installer package causes the client apparatus to function as:
one or more installers for installing software;
a log obtaining part that obtains logs that are output by the one or more installers, respectively, and system information of the client apparatus; and
a log transmission part that transmits log information that includes the logs and the system information to the log counting apparatus according to a setting in the installer package, and
the log counting part uses the system information included in the log information, and counts events concerning a process of installing the software while distinguishing an execution environment of the client apparatus such that the log counting part counts one event when the software is attempted to be installed multiple times by a same user of the client apparatus, and the log counting part counts separate events when the software is separately installed in different environments or by different users of the same physical client apparatus.

2. The non-transitory computer readable information recording medium as claimed in claim 1, wherein
the installer package causes the client apparatus to further function as:
a transmission screen page display part that, after the completion of the process of the one or more installers, displays on a display unit of the client apparatus a transmission screen page for receiving an instruction to transmit the log information; and
an uninstall part that, in a case where the transmission has not been completed and the process of installing the software has been interrupted, returns to a previous state before the installation of the software by the one or more installers.

3. The non-transitory computer readable information recording medium as claimed in claim 1, wherein
the log obtaining part collects the one or more logs that are output by the one or more installers, the system information and a general log provided by the installer package, and creates the log information.

4. The non-transitory computer readable information recording medium as claimed in claim 1, wherein
the installer package further includes: authentication information that is issued at a time of delivery of the installer package, which is encrypted and embedded, and
the log transmission part transmits the log information, attaching the authentication information thereto.

5. The non-transitory computer readable information recording medium as claimed in claim 1, wherein
the log transmission part transmits license authentication information including the log information, and
the log counting apparatus includes a license allowing part that allows issuance to the client apparatus which has transmitted the license authentication information a license code for making at least one of one or more sets of the software that have been installed by the one or more installers valid.

6. The non-transitory computer readable information recording medium as claimed in claim 1, wherein
the log transmission part transmits license authentication information including the log information as an electronic mail, and
the log counting apparatus includes a mail transmission part that, in a case of having received the electronic mail of the license authentication information, transmits to a return address of the electronic mail an electronic mail including a license code for making at least one of one or more sets of the software that have been installed by the one or more installers valid.

7. The non-transitory computer readable information recording medium as claimed in claim 1, wherein
the log counting program further causes the computer to function as a reporting part that, in a case where previously set reporting conditions are met as a result of the log counting part carrying out counting concerning the log information, reports to a registered contact address that the reporting conditions are met.

8. A log counting apparatus that is capable of communicating with a client apparatus via a communication network, comprising:
a log collection part that collects log information from the client apparatus in which an installer package operates; and
a log counting part, implemented by a processor, that carries out counting concerning the collected log information, wherein
the installer package causes the client apparatus to function as:
one or more installers for installing software;
a log obtaining part that obtains logs that are output by the one or more installers, respectively, and system information of the client apparatus; and
a log transmission part that transmits log information that includes the logs and the system information to the log counting apparatus according to a setting in the installer package, and
the log counting part uses the system information included in the log information, and counts events concerning the installation while distinguishing an execution environment of the client apparatus such that the log counting part counts one event when the software is attempted to be installed multiple times by a same user of the client apparatus, and the log counting part counts separate events when the software is separately installed in different environments or by different users of the same physical client apparatus.

9. A package creation method, executed by a computer, for creating an installer package executable by a client apparatus, the package creation method comprising:
receiving a setting that includes selection of one or more sets of software to be installed, carried out by the computer; and
reading out a package installer control program and one or more installers corresponding to the one or more sets of software, respectively, including them and creating the installer package, carried out by the computer, wherein
the package installer control program is executed by the client apparatus and causes the client apparatus to function as:
a control part that starts the one or more installers;
a log obtaining part that obtains logs output by the respective one or more installers and system information that describes an execution environment of the client apparatus; and
a log transmission part that transmits, according to a setting included in the installer package, log information including the logs and the system information to a log counting apparatus which uses the system information included in the log information, and counts events concerning the installation while distinguishing an execution environment of the client apparatus such that the log counting apparatus counts one event when the software is attempted to be installed multiple times by a same user of the client apparatus, and the log counting appartus counts separate events when the software is separately installed in different environments or by different users of the same physical client apparatus.

* * * * *